United States Patent
Kanai et al.

(10) Patent No.: US 9,381,694 B2
(45) Date of Patent: Jul. 5, 2016

(54) MULTI-LAMINATED BODY MANUFACTURING METHOD AND ITS MANUFACTURING APPARATUS, AND MULTI-LAMINATED BODY

(75) Inventors: Shimon Kanai, Ibaraki (JP); Toshiyuki Zento, Ibaraki (JP); Kohta Tomiyama, Ibaraki (JP); Hiromichi Nakata, Ibaraki (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 623 days.

(21) Appl. No.: 13/699,928

(22) PCT Filed: May 16, 2011

(86) PCT No.: PCT/JP2011/002711
§ 371 (c)(1),
(2), (4) Date: Nov. 26, 2012

(87) PCT Pub. No.: WO2011/148585
PCT Pub. Date: Dec. 1, 2011

(65) Prior Publication Data
US 2013/0065015 A1    Mar. 14, 2013

(30) Foreign Application Priority Data

May 25, 2010 (JP) ................................ 2010-119395
Jun. 3, 2010 (JP) ................................ 2010-127789

(51) Int. Cl.
*B29C 47/70* (2006.01)
*B29C 47/06* (2006.01)
(Continued)

(52) U.S. Cl.
CPC ............ *B29C 47/065* (2013.01); *B29C 47/062* (2013.01); *B29C 47/707* (2013.01);
(Continued)

(58) Field of Classification Search
None
See application file for complete search history.

(56) References Cited

U.S. PATENT DOCUMENTS 3,239,197 A * 3/1966 Tollar .................... B01F 5/064
138/42
5,094,788 A    3/1992 Schrenk et al.
(Continued)

FOREIGN PATENT DOCUMENTS

| JP | 4 278324   | 10/1992 |
|----|------------|---------|
| JP | 2005 349681 | 12/2005 |

(Continued)

OTHER PUBLICATIONS

International Search Report Issued Jun. 7, 2011 in PCT/JP11/002711 Filed May 16, 2011.

*Primary Examiner* — Jeffrey Wollschlager
(74) *Attorney, Agent, or Firm* — Oblon, McClelland, Maier & Neustadt, L.L.P.

(57) ABSTRACT

A manufacturing method of a multi-laminated body according to the present invention includes a step 1 (L-flow path) for vertically dividing a laminated flow obtained by arranging at least two molten resins adjacent to each other in a lengthwise direction into two sections, guiding the divided laminated flows to opposite directions relative to the flow direction, and then guiding both laminated flows toward the center of the flow direction, and rearranging the laminated flows adjacent to each other in the horizontal direction and thereby joining the laminated flows together, and a step 2 (R-flow path) for vertically dividing a laminated flow obtained by arranging at least two molten resins adjacent to each other in a lengthwise direction into two sections, guiding the divided laminated flows to directions opposite to the above-mentioned directions relative to the flow direction, and then guiding both laminated flows toward the center of the flow direction, and rearranging the laminated flows adjacent to each other in the horizontal direction and thereby joining the laminated flows together, in which the step 1 (L-flow path) and the step 1 (R-flow path) are alternately repeated in this listed order, and a number of the steps to be performed is at least three. According to this method, it is possible to prevent the layer disappearance at both ends, prevent the layer thickness variations or the disruption in the lengthwise arrangement, and thereby manufacture a multi-laminated body having a more excellent uniformity.

4 Claims, 11 Drawing Sheets

(51) Int. Cl.
　　　B29C 47/00　　　(2006.01)
　　　B29C 47/14　　　(2006.01)
　　　B29C 47/56　　　(2006.01)
　　　B29C 47/12　　　(2006.01)
　　　B29L 7/00　　　(2006.01)
　　　B29L 9/00　　　(2006.01)
　　　B29L 11/00　　　(2006.01)

(52) U.S. Cl.
　　　CPC ......... *B29C47/0019* (2013.01); *B29C 47/0021* (2013.01); *B29C 47/128* (2013.01); *B29C 47/145* (2013.01); *B29C 47/56* (2013.01); *B29C 47/70* (2013.01); *B29C 47/702* (2013.01); *B29C 2947/926* (2013.01); *B29C 2947/92104* (2013.01); *B29C 2947/92152* (2013.01); *B29C 2947/92171* (2013.01); *B29C 2947/92447* (2013.01); *B29C 2947/92904* (2013.01); *B29L 2007/008* (2013.01); *B29L 2009/00* (2013.01); *B29L 2011/00* (2013.01); *Y10T 428/24174* (2015.01)

(56) References Cited

U.S. PATENT DOCUMENTS

| | | | |
|---|---|---|---|
| 2005/0064160 A1* | 3/2005 | Watson et al. | 428/212 |
| 2010/0239700 A1* | 9/2010 | Winroth | B29C 47/0021 425/131.1 |
| 2012/0007277 A1* | 1/2012 | Nakamura | B01F 5/0641 264/241 |
| 2012/0052245 A1* | 3/2012 | Hoium | B29C 47/0021 428/156 |
| 2012/0098156 A1* | 4/2012 | Ausen | B29C 47/0021 264/171.1 |
| 2012/0156364 A1* | 6/2012 | Fork | B29C 47/026 427/58 |

FOREIGN PATENT DOCUMENTS

| | | |
|---|---|---|
| JP | 2006-327079 A | 12/2006 |
| WO | 2010 017271 | 2/2010 |

* cited by examiner

EXAMPLE 1-2 (L/R/L/R)

COMPARATIVE EXAMPLE 1-2 (L/L/L/L)

COMPARATIVE EXAMPLE 1-3 (L/R/R/L)

COMPARATIVE EXAMPLE 1-4 (L/L/R/R)

COMPARATIVE EXAMPLE 1-5 (L/L/L/R)

EXAMPLE 1-3 (L/R/L/R/L/R)

COMPARATIVE EXAMPLE 1-6 (L/L/L/L/L/L)

EXAMPLE 2-1        COMPARATIVE EXAMPLE 2-1

EXAMPLE 2-4        COMPARATIVE EXAMPLE 2-4

MULTI-LAMINATED BODY MANUFACTURING METHOD AND ITS MANUFACTURING APPARATUS, AND MULTI-LAMINATED BODY

TECHNICAL FIELD

The present invention relates to a multi-laminated body composed of a high polymer material(s) having a melt-fluidity and a hardening ability, its manufacturing method, and its manufacturing apparatus.

BACKGROUND ART

In recent years, developments to uses for high-functionality films for packaging and other films for the purpose of improving the barrier property, especially for optical films using optical control such as a polarizing-plate protection film of a liquid crystal display device and an optical compensation film has been in progress.

For example, by alternately laminating a layer having a high refractivity and a layer having a low refractivity a number of times, an optical interference film that selectively reflects light having a specific wavelength or lets the light pass therethrough by the interference of the light between these layers is obtained. By adjusting the wavelength range of the light that is selectively reflected or let pass through the film to a visible light range, such laminated films have been widely used, for example, for a reflective-type polarizing plate or a chromogenic film, a metallic film, or a reflective mirror film. Further, by adjusting the film so as to selectively block near-infrared light, the film can be used as a film that is put up on a window to block the sunlight. Therefore, multi-laminated films are expected to be used for various purposes.

The above-described multi-laminated film is formed by laterally laminating films in the direction of the film thickness by using a multi-layer extrusion technique (Patent literatures 1 and 2). In this multi-layer extrusion technique, various types of thermoplastic materials are supplied from various extrusion machines and forced to pass though a multi-layer manifold die, a multi-layer feed block, and a film die. By doing so, each flow is fused in the feed block, laminated, and fed into the die, and a laminated body is thereby formed.

For example, it is stated in the paragraph [0010] of Patent literature 1 that: a first flow composed of discrete, overlapping layers of the one or more materials is divided into a plurality of branch flows; these branch flows are redirected or repositioned and individually symmetrically expanded and contracted; the resistance to the flow of each of the branch flows is independently adjusted; the branch flows are recombined into a overlapping state; and a second flow in which a extremely large number of discrete, overlapping layers of the one or more materials are distributed in a predetermined gradient or in other distribution states is thereby formed. Meanwhile, Patent literature 2 discloses a method for manufacturing a multi-layer laminated film which is composed of at least two types of thermoplastic resin layers and in which the number of lamination layers is at least two, by using a lamination apparatus having such a structure that the size of each section of a flow path satisfies a predetermined relation in order to reduce the variations among the lamination layers of the multi-layer laminated film.

However, since the manufacturing methods according to Patent literatures 1 and 2 form lamination layers in which the layers are oriented in a lateral direction, there is a problem that thickness variations among layers occur, and thus making it impossible to form uniform layers.

To solve the above-described problem, and as the purposes of multi-layer films are diversified, new multi-layer film manufacturing methods and manufacturing apparatuses different from those in which layers are laminated in the direction of the film thickness have been examined.

For example, Patent literature 3 proposes a method and an apparatus for manufacturing a multi-laminated body oriented in a lengthwise direction, by dividing a viscous high polymer fluid having at least two layers at an early stage, rearranging the divided high polymer fluid, and then recombining the rearranged high polymer fluid. Specifically, Patent literature 3 discloses a manufacturing method of a multi-layer laminated body oriented in a lengthwise direction, including: providing at least a first flow of a first hardenable fluid and a second flow of a second hardenable fluid; combining the first flow with the second flow to supply a combined flow of fluid composed of the first fluid and the second fluid; dividing the combined flow into a plurality of flows, each of the plurality of flows being composed of the first fluid and the second fluid; arranging the plurality of flows laterally adjacent to each other; and fusing the plurality of laterally-adjacent flows to provide a lengthwise-oriented multi-layer laminated body. In this aspect, Patent literature 3 discloses a method including: dividing a first flow into two flows of a first fluid; and combining a second flow, including combining the two flows of the first fluid with the second flow to provide the first flow and a third flow.

However, the manufacturing method according to Patent literatures 3 uses a mechanism for forming an arrangement in which a vertical division and a horizontal arrangement are repeated. Therefore, it is such a mechanism that the flow path from the vertical division to the horizontal arrangement is short in order to reduce the overall length of the apparatus. Therefore, there is a problem that layers at the left/right ends of an obtained lengthwise-oriented article could disappear as the number of times of the divisions and the arrangements increases, and thus causing thickness variations among the layers and disruptions in the lengthwise arrangement. Note that in the apparatus shown in FIG. 7 of Patent literature 3, a value L2/L1, which is defined in this specification, is 0.58.

That is, as shown as Comparative examples 1-2 to 1-5 shown in FIG. 4 of this specification and Comparative examples 2-1 and 2-4 shown in FIGS. 10 and 11 respectively, local flow speed variations occur in a laminated flow flowing through a flow path within the apparatus in which a division(s), a branching(s), a rearrangement(s), and a recombining(s) are carried out. As a result, every time the division, the branching, the rearrangement, and the recombining are repeated, the effect of the variations becomes larger, and thus causing a problem that the cross section of the lamination is disrupted and the layers are vertically lowered. In the above-described defective part, once a defective part occurs in the laminated body, the rate of the defective part increases every time the division and the rearrangement are repeated. Therefore, there is a problem that eventually the rate of the defective part increases so much that the performance of the apparatus is adversely affected.

CITATION LIST

Patent Literature

Patent literature 1: Japanese Unexamined Patent Application Publication No. H04-278324
Patent literature 2: Japanese Unexamined Patent Application Publication No. 2005-349681
Patent literature 3: International Patent Publication No. WO2010/017271

SUMMARY OF INVENTION

Technical Problem

In the above-described manufacturing method and manufacturing apparatus, local flow speed variations occur in a laminated flow flowing through a flow path within the apparatus in which a division(s), a branching(s), and a recombining(s) are carried out. In addition, every time the division and the recombining are repeated, the effect of the variations becomes larger. Therefore, disruptions in the cross section of the lamination tend to occur. As a result, defective parts such as thickness variations and a vertical reduction of layers have occurred in multi-laminated bodies formed in the form of multiple layers.

The present invention has been made in order to solve the above-described problem, and an object thereof is to provide a manufacturing method of a multi-laminated body and its manufacturing apparatus capable of preventing the disappearance of layers at both ends, preventing the thickness variations among the layers or the disruption in the lengthwise arrangement, and thereby manufacturing a multi-laminated body having a more excellent uniformity.

Solution to Problem

A first manufacturing method of a multi-laminated body according to the present invention includes:

a step 1 (L-flow path) for vertically dividing a laminated flow obtained by arranging at least two molten resins adjacent to each other in a lengthwise direction into two sections, and forming an upper laminated flow and a lower laminated flow obtained by the division into a first laminated flow and a second laminated flow respectively, guiding the first laminated flow to a left direction relative to a flow direction, guiding the second laminated flow to a right direction relative to the flow direction, then guiding the first laminated flow to a lower right direction toward a center of the flow direction, guiding the second laminated flow to an upper left direction toward the center of the flow direction, and then rearranging the first and second laminated flows adjacent to each other in a horizontal direction and thereby joining the first and second laminated flows together; and a step 2 (R-flow path) for vertically dividing a laminated flow obtained by arranging at least two molten resins adjacent to each other in a lengthwise direction into two sections, and forming an upper laminated flow and a lower laminated flow obtained by the division into a third laminated flow and a fourth laminated flow respectively, guiding the third laminated flow to a right direction relative to a flow direction, guiding the fourth laminated flow to a left direction relative to the flow direction, then guiding the third laminated flow to a lower left direction toward a center of the flow direction, guiding the fourth laminated flow to an upper right direction toward the center of the flow direction, and then rearranging the third and fourth laminated flows adjacent to each other in a horizontal direction and thereby joining the third and fourth laminated flows together, in which the step 1 (L-flow path) and the step 2 (R-flow path) are alternately repeated in this listed order, and a number of the steps to be performed is at least three.

A second manufacturing method of a multi-laminated body according to the present invention includes:

a step 2 (R-flow path) for vertically dividing a laminated flow obtained by arranging at least two molten resins adjacent to each other in a lengthwise direction into two sections, and forming an upper laminated flow and a lower laminated flow obtained by the division into a first laminated flow and a second laminated flow respectively, guiding the first laminated flow to a right direction relative to a flow direction, guiding the second laminated flow to a left direction relative to the flow direction, then guiding the first laminated flow to a lower left direction toward a center of the flow direction, guiding the second laminated flow to an upper right direction toward the center of the flow direction, and then rearranging the first and second laminated flows adjacent to each other in a horizontal direction and thereby joining the first and second laminated flows together; and a step 1 (L-flow path) for vertically dividing a laminated flow obtained by arranging at least two molten resins adjacent to each other in a lengthwise direction into two sections, and forming an upper laminated flow and a lower laminated flow obtained by the division into a third laminated flow and a fourth laminated flow respectively, guiding the third laminated flow to a left direction relative to a flow direction, guiding the fourth laminated flow to a right direction relative to the flow direction, then guiding the third laminated flow to a lower right direction toward a center of the flow direction, guiding the fourth laminated flow to an upper left direction toward the center of the flow direction, and then rearranging the third and fourth laminated flows adjacent to each other in a horizontal direction and thereby joining the third and fourth laminated flows together, in which the step 2 (R-flow path) and the step 1 (L-flow path) are alternately repeated in this listed order, and a number of the steps to be performed is at least three.

A third manufacturing method of a multi-laminated body according to the present invention includes:

arranging at least two molten resins adjacent to each other in a lengthwise direction and forming a laminated flow having a predetermined width and thickness;

vertically dividing, at a division point, the laminated flow into two sections, and forming an upper laminated flow and a lower laminated flow obtained by the division into a first laminated flow and a second laminated flow respectively;

guiding, at a branch point, the first laminated flow to a left direction relative to a flow direction and guiding the second laminated flow to a right direction relative to the flow direction;

guiding, at a middle point, the first laminated flow to a lower right direction toward a center of the flow direction, guiding the second laminated flow to an upper left direction toward the center of the flow direction; and rearranging, at a junction point, the first and second laminated flows adjacent to each other in a horizontal direction and thereby joining the first and second laminated flows together, in which the laminated flow having the predetermined width and thickness satisfies a relation "$L2/L1 \geq 1.1$" where $L1$ is a longer one of the width and the thickness of the laminated flow and $L2$ is a length from the branch point to the junction point in a flow movement direction.

A fourth manufacturing method of a multi-laminated body according to the present invention includes:

arranging at least two molten resins adjacent to each other in a lengthwise direction and forming a laminated flow having a predetermined width and thickness;

vertically dividing, at a division point, the laminated flow into two sections, and forming an upper laminated flow and a lower laminated flow obtained by the division into a first laminated flow and a second laminated flow respectively;

guiding, at a branch point, the first laminated flow to a right direction relative to a flow direction and guiding the second laminated flow to a left direction relative to the flow direction;

guiding, at a middle point, the first laminated flow to a lower left direction toward a center of the flow direction, guiding the second laminated flow to an upper right direction toward the center of the flow direction; and rearranging, at a junction point, the first and second laminated flows adjacent to each other in a horizontal direction and thereby joining the first and second laminated flows together, in which the laminated flow having the predetermined width and thickness satisfies a relation "L2/L1≥1.1" where L1 is a longer one of the width and the thickness of the laminated flow and L2 is a length from the branch point to the junction point in a flow movement direction.

A fifth manufacturing method of a multi-laminated body according to the present invention includes:

a first step including:

arranging at least two molten resins adjacent to each other in a lengthwise direction and forming a laminated flow having a predetermined width and thickness;

vertically dividing, at a division point A2, the laminated flow into two sections, and forming an upper laminated flow and a lower laminated flow obtained by the division into a first laminated flow and a second laminated flow respectively;

guiding, at a branch point B2, the first laminated flow to a left direction relative to a flow direction and guiding the second laminated flow to a right direction relative to the flow direction;

guiding, at a middle point C2, the first laminated flow to a lower right direction toward a center of the flow direction, guiding the second laminated flow to an upper left direction toward the center of the flow direction; and rearranging, at a junction point D2, the first and second laminated flows adjacent to each other in a horizontal direction and thereby joining the first and second laminated flows together; and a second step including:

vertically dividing, at a division point E2, the rearranged and joined laminated flow into two sections, and forming an upper laminated flow and a lower laminated flow obtained by the division into a third laminated flow and a fourth laminated flow respectively;

guiding, at a branch point F2, the third laminated flow to a right direction relative to a flow direction and guiding the fourth laminated flow to a left direction relative to the flow direction;

guiding, at a middle point G2, the third laminated flow to a lower left direction toward a center of the flow direction, guiding the fourth laminated flow to an upper right direction toward the center of the flow direction; and rearranging, at a junction point H2, the third and fourth laminated flows adjacent to each other in a horizontal direction and thereby joining the third and fourth laminated flows together, in which the laminated flow having the predetermined width and thickness satisfies a relation "L2/L1≥1.1" where L1 is a longer one of the width and the thickness of the laminated flow and L2 is a length from the branch point B2 to the junction point D2 and/or from the branch point F2 to the junction point H2 in a flow movement direction.

A sixth manufacturing method of a multi-laminated body according to the present invention includes:

a first step including:

arranging at least two molten resins adjacent to each other in a lengthwise direction and forming a laminated flow having a predetermined width and thickness;

vertically dividing, at a division point A2, the laminated flow into two sections, and forming an upper laminated flow and a lower laminated flow obtained by the division into a first laminated flow and a second laminated flow respectively;

guiding, at a branch point B2, the first laminated flow to a right direction relative to a flow direction and guiding the second laminated flow to a left direction relative to the flow direction;

guiding, at a middle point C2, the first laminated flow to a lower left direction toward a center of the flow direction, guiding the second laminated flow to an upper right direction toward the center of the flow direction; and rearranging, at a junction point D2, the first and second laminated flows adjacent to each other in a horizontal direction and thereby joining the first and second laminated flows together; and a second step including:

vertically dividing, at a division point E2, the rearranged and joined laminated flow into two sections, and forming an upper laminated flow and a lower laminated flow obtained by the division into a third laminated flow and a fourth laminated flow respectively;

guiding, at a branch point F2, the third laminated flow to a left direction relative to a flow direction and guiding the fourth laminated flow to a right direction relative to the flow direction;

guiding, at a middle point G2, the third laminated flow to a lower right direction toward a center of the flow direction, guiding the fourth laminated flow to an upper left direction toward the center of the flow direction; and rearranging, at a junction point H2, the third and fourth laminated flows adjacent to each other in a horizontal direction and thereby joining the third and fourth laminated flows together, in which the laminated flow having the predetermined width and thickness satisfies a relation "L2/L1≥1.1" where L1 is a longer one of the width and the thickness of the laminated flow and L2 is a length from the branch point B2 to the junction point D2 and/or from the branch point F2 to the junction point H2 in a flow movement direction.

A first manufacturing apparatus of a multi-laminated body according to the present invention includes:

a set of L-flow-path-shape plates including:

a division plate that vertically divides a laminated flow obtained by arranging at least two molten resins adjacent to each other in a lengthwise direction into two sections;

an arrangement plate (L-flow path) including a flow path that guides the upper laminated flow obtained by the division by the division plate to a left direction and a flow path that guides the lower laminated flow to a right direction, and subsequently a flow path that guides the upper laminated flow to a lower right direction toward a center and a flow path that guides the lower laminated flow to an upper left direction toward the center; and a parallel plate that rearranges the laminated flows, which are arranged in a horizontal direction by the arrangement plate (L-flow path), and thereby joining the laminated flows together; and a set of R-flow-path-shape plates including:

a division plate that vertically divides a laminated flow obtained by arranging at least two molten resins adjacent to each other in a lengthwise direction into two sections;

an arrangement plate (R-flow path) including a flow path that guides the upper laminated flow obtained by the division by the division plate to a right direction and a flow path that guides the lower laminated flow to a left direction, and subsequently a flow path that guides the upper laminated flow to a lower left direction toward a center and a flow path that guides the lower laminated flow to an upper right direction toward the center; and a parallel plate that rearranges the laminated flows, which are arranged in a horizontal direction by the arrangement plate (R-flow path), and thereby joining the laminated flows together, in which at least two pairs of the set of L-flow-path-shape plates and the set of R-flow-path-shape plates are alternately arranged.

A second manufacturing apparatus of a multi-laminated body according to the present invention includes:

a set of L-flow-path-shape plates including:

a division plate that vertically divides a laminated flow formed by arranging at least two molten resins adjacent to each other in a lengthwise direction into two sections at a division point, the laminated flow having a predetermined width and thickness;

an arrangement plate (L-flow path) including a flow path that guides the upper laminated flow obtained by the division by the division plate to a left direction at a branch point and a flow path that guides the lower laminated flow to a right direction, and subsequently a flow path that guides the upper laminated flow to a lower right direction toward a center at a middle point and a flow path that guides the lower laminated flow to an upper left direction toward the center; and a parallel plate that rearranges the laminated flows, which are arranged in a horizontal direction by the arrangement plate (L-flow path), at a junction point and thereby joining the laminated flows together, in which the laminated flow having the predetermined width and thickness satisfies a relation "L2/L1≥1.1" where L1 is a longer one of the width and the thickness of the laminated flow and L2 is a length from the branch point to the junction point in a flow movement direction.

A third manufacturing apparatus of a multi-laminated body according to the present invention includes:

a set of R-flow-path-shape plates including:

a division plate that vertically divides a laminated flow formed by arranging at least two molten resins adjacent to each other in a lengthwise direction into two sections at a division point, the laminated flow having a predetermined width and thickness;

an arrangement plate (R-flow path) including a flow path that guides the upper laminated flow obtained by the division by the division plate to a right direction at a branch point and a flow path that guides the lower laminated flow to a left direction, and subsequently a flow path that guides the upper laminated flow to a lower left direction toward a center at a middle point and a flow path that guides the lower laminated flow to an upper right direction toward the center; and a parallel plate that rearranges the laminated flows, which are arranged in a horizontal direction by the arrangement plate (R-flow path), at a junction point and thereby joining the laminated flows together, in which the laminated flow having the predetermined width and thickness satisfies a relation "L2/L1≥1.1" where L1 is a longer one of the width and the thickness of the laminated flow and L2 is a length from the branch point to the junction point in a flow movement direction.

A fourth manufacturing apparatus of a multi-laminated body according to the present invention includes:

a set of L-flow-path-shape plates including:

a division plate that vertically divides a laminated flow formed by arranging at least two molten resins adjacent to each other in a lengthwise direction into two sections at a division point A2, the laminated flow having a predetermined width and thickness;

an arrangement plate (L-flow path) including a flow path that guides the upper laminated flow obtained by the division by the division plate to a left direction at a branch point B2 and a flow path that guides the lower laminated flow to a right direction, and subsequently a flow path that guides the upper laminated flow to a lower right direction toward a center at a middle point C2 and a flow path that guides the lower laminated flow to an upper left direction toward the center; and a parallel plate that rearranges the laminated flows, which are arranged in a horizontal direction by the arrangement plate (L-flow path), at a junction point D2 and thereby joining the laminated flows together; and a set of R-flow-path-shape plates including:

a division plate that vertically divides a laminated flow formed by arranging at least two molten resins adjacent to each other in a lengthwise direction into two sections at a division point E2;

an arrangement plate (R-flow path) including a flow path that guides the upper laminated flow obtained by the division by the division plate to a right direction at a branch point F2 and a flow path that guides the lower laminated flow to a left direction, and subsequently a flow path that guides the upper laminated flow to a lower left direction toward a center at a middle point G2 and a flow path that guides the lower laminated flow to an upper right direction toward the center; and a parallel plate that rearranges the laminated flows, which are arranged in a horizontal direction by the arrangement plate (R-flow path), at a junction point H2 and thereby joining the laminated flows together, in which at least two pairs of the set of L-flow-path-shape plates and the set of R-flow-path-shape plates are alternately arranged, and in which the laminated flow having the predetermined width and thickness satisfies a relation "L2/L1≥1.1" where L1 is a longer one of the width and the thickness of the laminated flow and L2 is a length from the branch point B2 to the junction point D2 and/or from the branch point F2 to the junction point H2 in a flow movement direction.

A multi-laminated body according to the present invention is manufactured by any one of the above-described first to sixth manufacturing methods of a multi-laminated body according to the present invention.

Advantageous Effects of Invention

According to the present invention, the local flow speed variations, which occur in a flow path for forming a multi-laminated body, are reduced, and thus increasing the resistance to the disruption in the lamination. As a result, it is possible to prevent the disappearance of layers at both ends and to reduce the thickness variations among the layers or the disruption in the lengthwise arrangement. In addition, it is possible to form uniform layers while preventing the reduction in the thickness of the layers at both ends.

DESCRIPTION OF EMBODIMENTS

Figure 1:
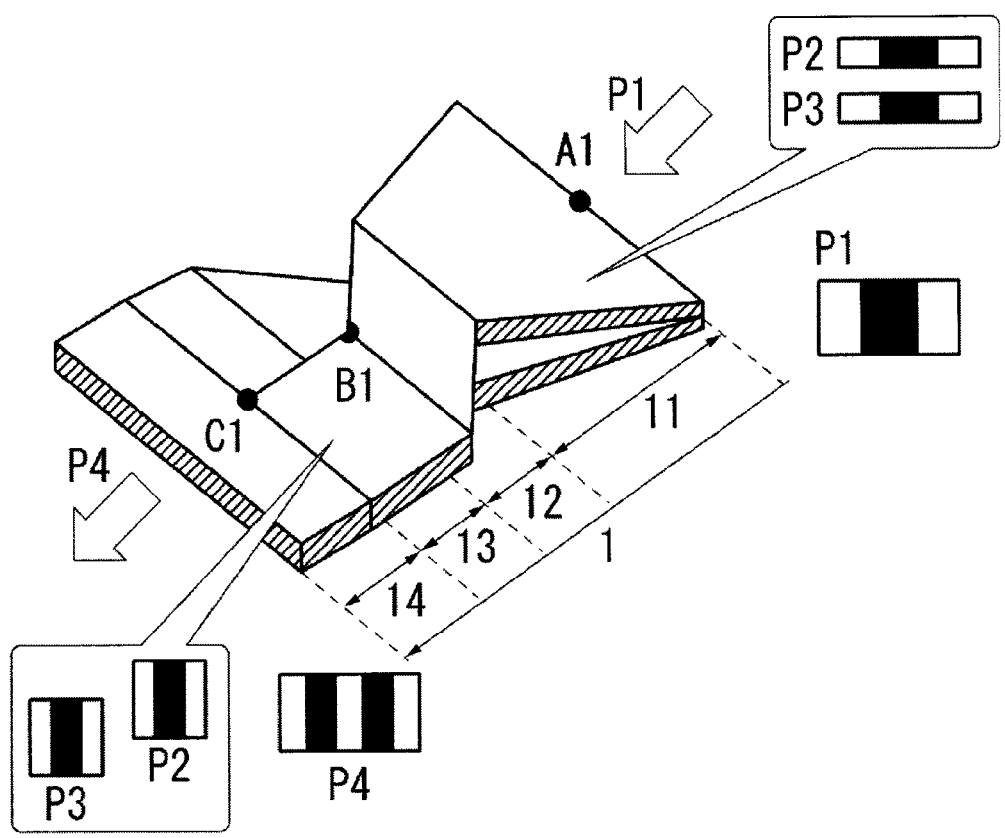
FIG. 1 is a schematic diagram of a manufacturing apparatus of a multi-laminated body according to a first exemplary embodiment of the present invention.

Exemplary embodiments according to the present invention are explained hereinafter with reference to the drawings. For clarifying the explanation, the following descriptions and drawings are partially omitted and simplified as appropriate. Components and equivalent parts having the same configuration or function are denoted by the same symbols throughout the drawings, and their duplicated explanation is omitted. Note that the terms "top", "bottom", "left", "right", "lengthwise", and "lateral" in the present invention are used based on the illustration in the drawings. However, the present invention also includes embodiments in which their configurations are rotated by a given angle around the flow direction with respect to those shown in the drawings and the terms "top", "bottom", "left", "right", "lengthwise", and "lateral" are thereby different from those shown in the drawings.

First Exemplary Embodiment

A method for manufacturing a multi-laminated body according to a first exemplary embodiment of the present invention is explained hereinafter.

The inventors of the present invention have diligently examined for a multi-laminated body capable of reducing the flow speed variations and reducing the thickness variations among the layers or the disruption in the lengthwise arrangement. In particular, the inventors have confirmed that the mechanism for arranging layers affects the stability of the layer structure. Therefore, the inventors have paid attention to the fact that in an arrangement in the same direction, layers at both ends disappear as the number of divisions increases and the shape of the middle layer is thereby disrupted, and have examined again and again for a multi-laminated body in which the thickness variations among the layers, the disruption in the arrangement, and the disappearance of layers at both ends do not occur.

As a result, the inventors have found an arrangement configuration in which after a laminated flow is divided, arrangements are alternately configured in terms of the left/right direction, and thereby have arrived at and completed the present invention.

Figure 2:
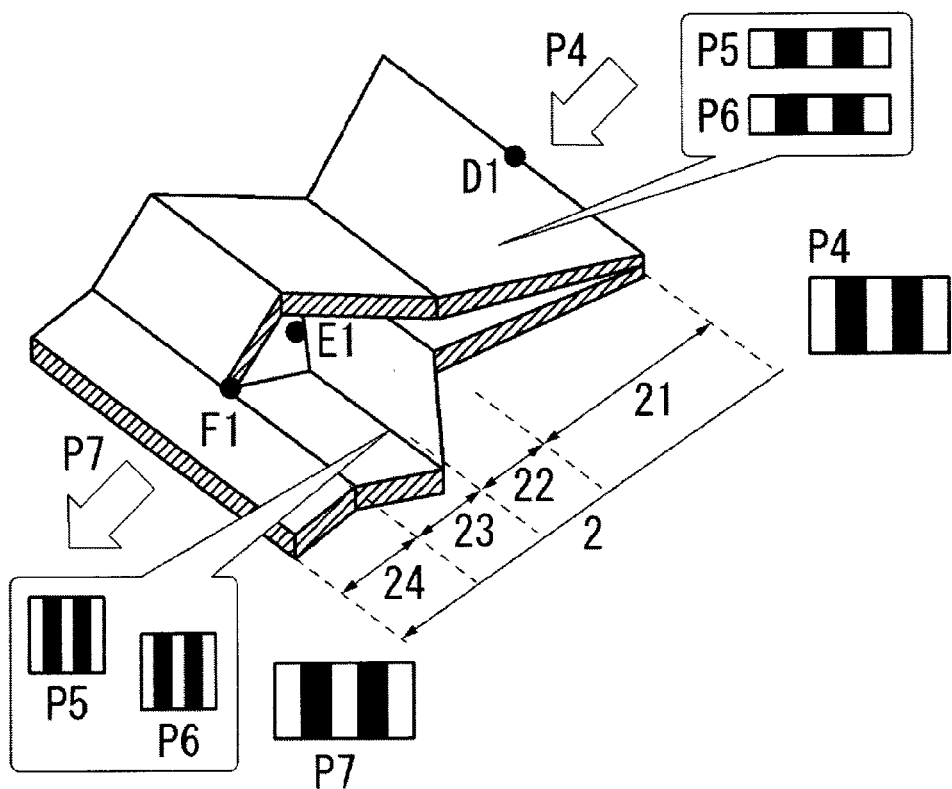
FIG. 2 is a schematic diagram of a manufacturing apparatus of a multi-laminated body according to a first exemplary embodiment of the present invention.

FIGS. 1 and 2 are schematic diagrams of a manufacturing apparatus of a multi-laminated body according to a first exemplary embodiment of the present invention.

A multi-laminated body according to this exemplary embodiment is manufactured through a series of processes shown in FIG. 1 and a series of processes shown in FIG. 2.

As shown in FIG. 1, an operation for dividing a laminated flow is performed by a division mechanism 11; an operation for branching the laminated flows is performed by a branch mechanism 12; an operation for rearranging the laminated flows is performed by a rearrangement joining mechanism 13; and an operation for joining the laminated flows together is performed by a stabilization mechanism 14.

Each of the above-described division mechanism 11, the branch mechanism 12, the rearrangement joining mechanism 13, and the stabilization mechanism 14 is explained hereinafter in detail.

As shown in FIG. 1, a resin flow in which at least two molten resins, i.e., at least two layers of fluids are arranged in a lengthwise direction is forced to pass through this apparatus. In the division mechanism 11, a division operation is performed at a division point A1, in which the laminated flow P1 is divided into two sections in a direction perpendicular to the lengthwise direction, i.e., divided into upper and lower sections. Further, the upper laminated flow and the lower laminated flow are formed into a first laminated flow P2 and a second laminated flow P3 respectively. The laminated flows P2 and P3 divided by the division mechanism 11 are branched at the branch mechanism 12 by guiding the laminated flow P2 to the left direction relative to the flow direction with respect to the line connecting the resin division point A1 and a middle point B1 in the flow direction, and guiding the laminated flow P3 to the right direction relative to the flow direction. This operation is called "branch operation". Next, the branched laminated flows P2 and P3 are rearranged adjacent to each other in the horizontal direction in the rearrangement joining mechanism 13 by guiding the laminated flow P2 to the lower right direction toward the center of the flow direction and thereby to a junction point C1 and guiding the laminated flow P3 to the upper left direction toward the center of the flow direction and thereby to the junction point C1. As a result, a laminated flow P4 is formed. In this process, it is preferable that the laminated flows P2 and P3 are guided to the center in both the horizontal direction and the vertical direction. After that, a joining operation is performed for the rearranged and joined laminated flow P4 in the stabilization mechanism 14.

The series of theses process 1 (see FIG. 1) is referred to as "left rotation flow path" (hereinafter referred to as "L-flow path").

Next, the laminated flow P4, which is obtained by the above-described L-flow path, is interchanged as shown in FIG. 2, so that the number of the lamination layers of the laminated flow P4 is increased.

As shown in FIG. 2, the laminated flow P4, which is formed by the division mechanism 11, the branch mechanism 12, the rearrangement joining mechanism 13, and the stabilization mechanism 14 shown in FIG. 1, is supplied.

A division operation is performed at a division point D1 of a division mechanism 21 shown in FIG. 2, in which the laminated flow P4 is divided into two sections in a direction perpendicular to the lengthwise direction, i.e., divided into upper and lower sections, and third laminated flow P5 and a fourth laminated flow P6 are thereby formed. The laminated flows P5 and P6 divided by the division mechanism 21 are branched at a branch mechanism 22 by guiding the third laminated flow P5 to the right direction relative to the flow direction with respect to the line connecting the resin division point D1 and a middle point E1 in the flow direction, and guiding the fourth laminated flow P6 to the left direction relative to the flow direction. This operation is called "branch operation". Next, the branched laminated flows P5 and P6 are rearranged adjacent to each other in the horizontal direction in a rearrangement joining mechanism 23 by guiding the laminated flow P5 to the lower left direction toward the center of the flow direction and thereby to a junction point F1 and guiding the laminated flow P6 to the upper right direction toward the center of the flow direction and thereby to the junction point F1. As a result, a laminated flow P7 is formed. In this process, it is preferable that the laminated flows P5 and P6 are guided to the center in both the horizontal direction and the vertical direction. After that, a joining operation is performed for the rearranged and joined laminated flow P7 in a stabilization mechanism 24.

The series of theses process 2 (see FIG. 2) is referred to as "right rotation flow path" (hereinafter referred to as "R-flow path").

By increasing the number of lamination layers through the process in which the L-flow path and the R-flow path are combined, it is possible to reduce the local flow speed variations, which would occur in the conventional flow path shape used to form a multi-laminated body, and thus increasing the resistance to the disruption in the lamination and reducing the thickness variations among the layers. That is, by repeating the division/arrangement operations, it is possible to laminate multiple layers even further.

Figure 3:
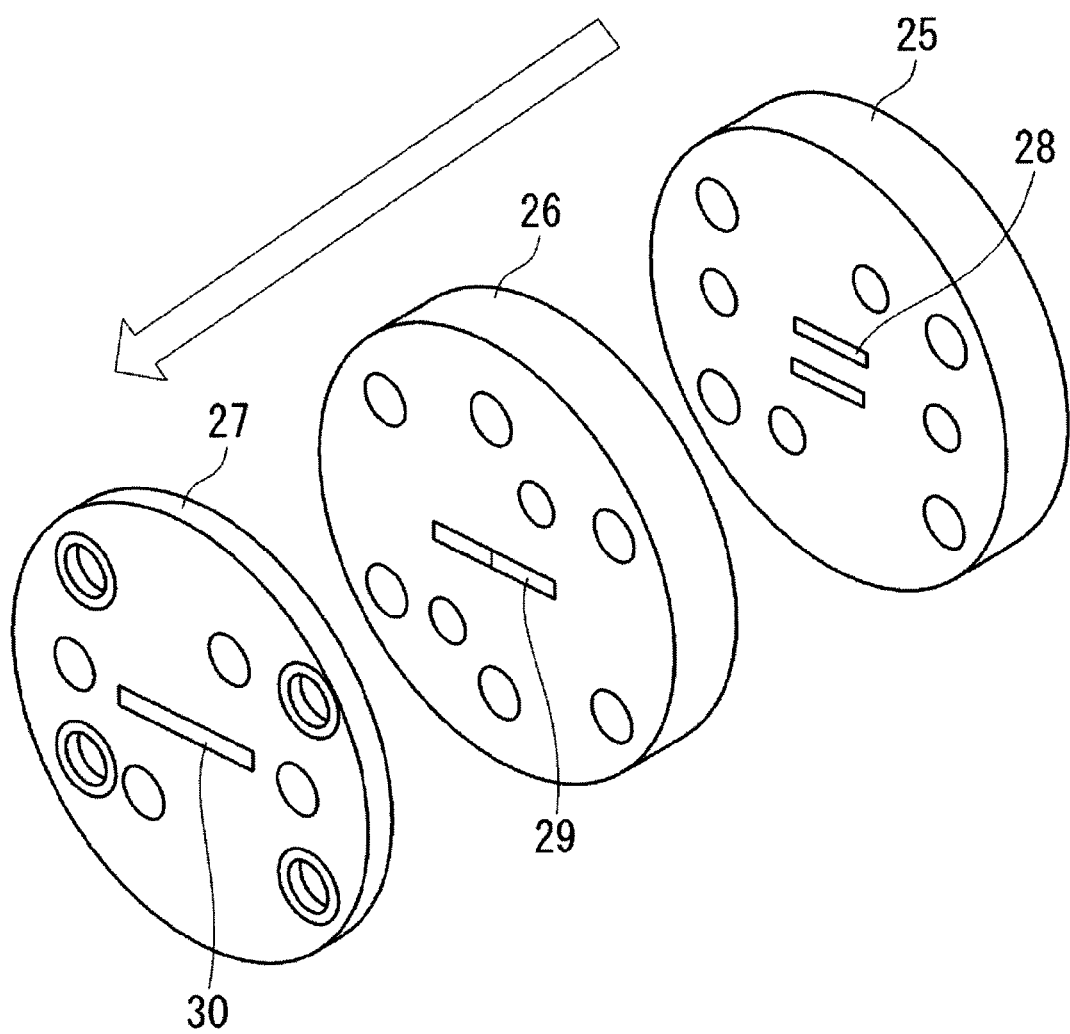
FIG. 3 is a schematic diagram of a set of plates (LME)

FIG. 3 shows a schematic view of a set of plates.

A manufacturing apparatus of a multi-laminated body is formed by alternately combining and arranging at least two pairs of a set of plates having an L-flow path and a set of plates having an R-flow path. Each set of plates (hereinafter called "LME") includes a division plate, an arrangement plate, and a parallel plate.

A manufacturing method of a multi-laminated body by using each plate of the LME(s) (Layer Multiplying Element(s)) is explained with reference to FIGS. 1 to 3.

Firstly, a set of plates having an L-flow path is explained.

The division plate vertically divides a laminated flow P1, which is obtained by arranging at least two molten resins adjacent to each other in a lengthwise direction, into two sections. The arrangement plate (L-flow path) includes a flow path that guides the upper laminated flow (first laminated flow: P2) obtained by the division by the above-described division plate to the left direction and a flow path that guides the lower laminated flow (second laminated flow: P3) to the right direction, and subsequently a flow path that guides the first laminated flow P2 to the lower right direction toward the center and a flow path that guides the second laminated flow P3 to the upper left direction toward the center. The parallel plate rearranges the laminated flows P2 and P3, which are arranged in the horizontal direction in the above-described arrangement plate, and thereby joins the laminated flows P2 and P3 together as a laminated flow P4.

Next, a set of plates having an R-flow path is explained.

The division plate vertically divides a laminated flow P4, which is obtained by arranging at least two molten resins adjacent to each other in a lengthwise direction, into two sections. An arrangement plate (R-flow path) includes a flow path that guides the upper laminated flow (third laminated flow: P5) obtained by the division by the above-described division plate to the right direction and a flow path that guides the lower laminated flow (fourth laminated flow: P6) to the left direction, and subsequently a flow path that guides the third laminated flow P5 to the lower left direction toward the center and a flow path that guides the fourth laminated flow P6 to the upper right direction toward the center. A parallel plate rearranges the laminated flows P5 and P6, which are arranged in the horizontal direction in the above-described arrangement plate, and thereby joins the laminated flows P5 and P6 together as a laminated flow P7.

A manufacturing apparatus of a multi-laminated body is formed by alternately combining and arranging at least two pairs of the set of plates having an L-flow path and the set of plates having an R-flow path.

Note that the number of apparatuses each including a set of a division plate, an arrangement plate, and a parallel plate, and the number of layers have a relation expressed by the following Expression (1).

$$\text{(Number of arranged layers)} = 2^{n+1} + 1 \quad (1)$$

(In the expression, n is the number of LMEs.)

Next, each plate of the LME is explained with reference to FIG. 3.

As shown in FIG. 3, a division plate 25 has one opening having a rectangular cross section on the surface of the side from which a laminated flow obtained by arranging at least two molten resins adjacent to each other in a lengthwise direction is supplied, and two openings 28, which are arranged in the vertical direction with a predetermined interval therebetween and each of which has a rectangular cross section, on the surface of the opposite side (outflow surface) of the division plate. Further, an arrangement plate 26 has two openings having a shape identical to that of the two openings formed in the outflow surface of the division plate, on the surface of the side abutting on the above-described division plate, and two openings 29, which are arranged in the horizontal direction with a predetermined interval therebetween and each of which has a rectangular cross section, on the surface of the opposite side (outflow surface) to the side abutting on the above-described division plate. Further, a parallel plate 27 has two openings having a shape identical to that of the two openings formed in the outflow surface of the arrangement plate, on the surface of the side abutting on the above-described arrangement plate, and one opening 30 having a rectangular cross section on the surface of the opposite side (outflow surface) to the side abutting on the above-described arrangement plate.

Note that there are no particular restrictions on the shape of these plates, and on the shape and the size of the openings formed in the plates.

By using the configuration like this, the defective parts due to the thickness variations are reduced. Therefore, the disappearance of layers, which would occur as the number of the repetitions of the division and the recombination increases, is reduced. As a result, it is possible to increase the number of alternately-laminated excellent layers to a number two times or four times as large as that of the conventional technique. Further, by using a manufacturing apparatus of a multi-laminated body having an L-flow path and an R-flow path according to this exemplary embodiment, it is possible to manufacture a lamination structure in which the degree of thickness variations among the layers is small.

Note that an example of a combination of processes for increasing the lamination layers is a combination of processes in which at least three pairs of an L-flow path and an R-flow path are alternately combined in order to increase the lamination layers. In a preferable process, the L-flow path and the R-flow path are alternately combined in an orderly fashion. For example, they are combined in the order of "L-flow path/R-flow path/L-flow path/R-flow path . . . ", or "R-flow path/L-flow path/R-flow path/L-flow path . . . ". By employing the configuration like this, it is possible to achieve advantageous effects that the variations among layers are prevented and the thicknesses of layers are thereby made equal to each other.

Second Exemplary Embodiment

A method for manufacturing a multi-laminated body according to a second exemplary embodiment of the present invention is explained hereinafter.

The inventors of the present invention have diligently examined for a multi-laminated body capable of reducing the flow speed variations, increasing the resistance to the disruption in the lamination, and reducing the inclination of layers. In particular, the inventors have paid attention to the fact that the resin flow speed is high and layers are thereby inclined at an arrangement section having a short flow path and a sharp curve, and have examined again and again the effect to the improvement in the layer verticality resulting from the increase in the length of the flow path in the arrangement section located behind the division section that is lengthened in order to smooth the flow of the laminated flow within the flow path. As a result, the inventors have found that the long flow path arrangement can dramatically improve the layer verticality, which is an important factor for the lengthwise arrangement, in comparison to the same-direction arrangement, and thereby have arrived at and completed the present invention.

Figure 6:
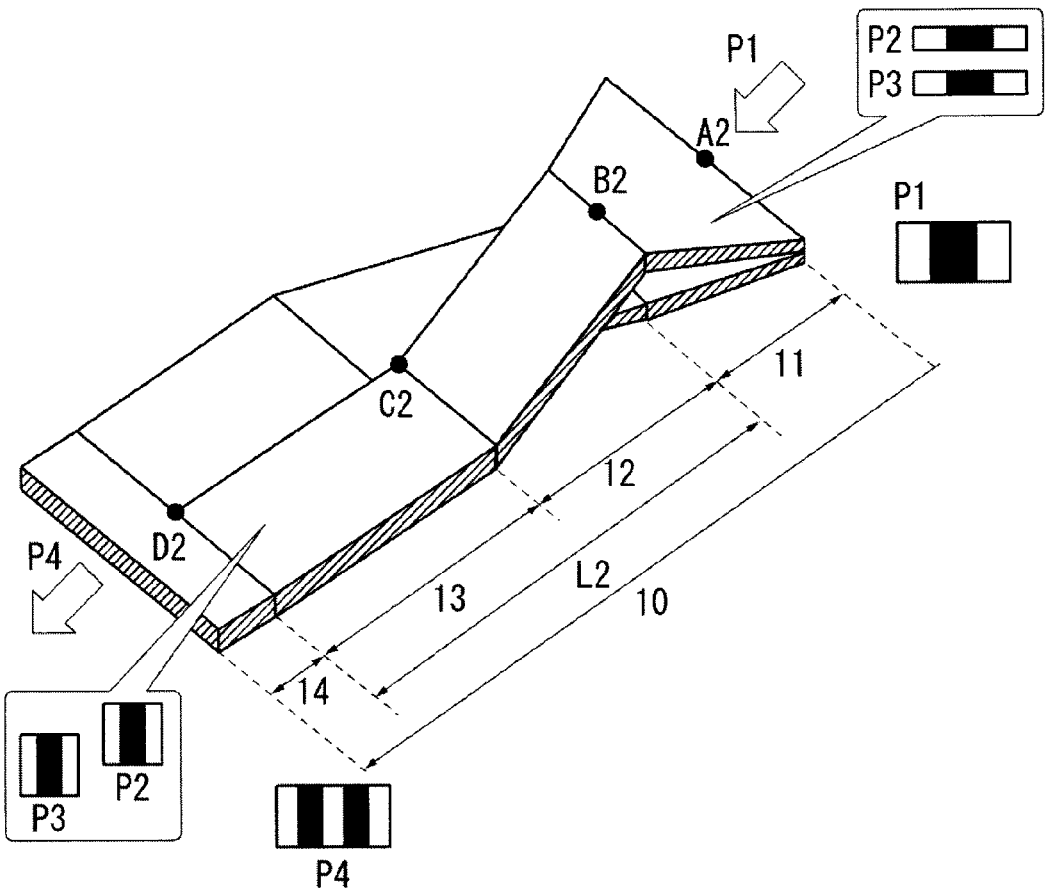
FIG. 6 is a schematic diagram of a manufacturing apparatus of a multi-laminated body according to a second exemplary embodiment of the present invention.
Figure 7:
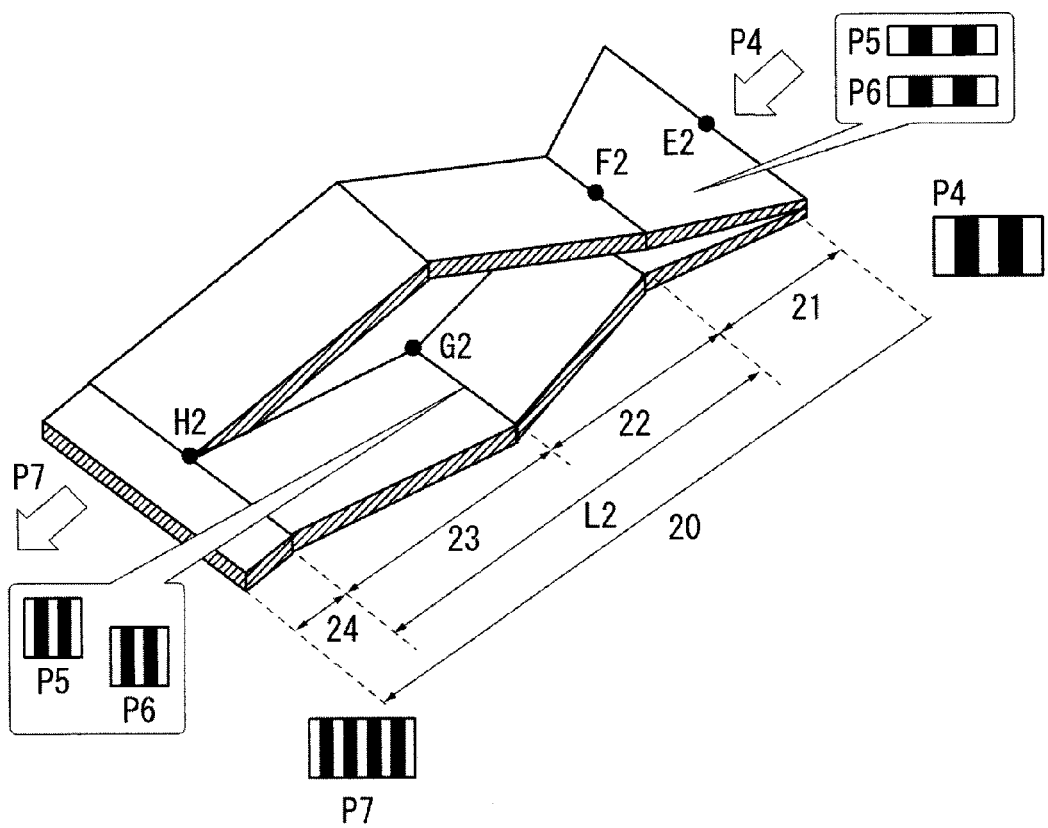
FIG. 7 is a schematic diagram of a manufacturing apparatus of a multi-laminated body according to a second exemplary embodiment of the present invention.

FIGS. 6 and 7 are schematic diagrams of a manufacturing apparatus of a multi-laminated body according to a second exemplary embodiment of the present invention.

A multi-laminated body according to this exemplary embodiment is manufactured through a series of processes shown in FIG. 6. That is, as shown in FIG. 6, an operation for dividing a laminated flow is performed by a division mechanism 11; an operation for branching the laminated flows is performed by a branch mechanism 12; an operation for rearranging the laminated flows is performed by a rearrangement joining mechanism 13; and an operation for joining the laminated flows together is performed by a stabilization mechanism 14.

Each of the above-described division mechanism 11, the branch mechanism 12, the rearrangement joining mechanism 13, and the stabilization mechanism 14 is explained hereinafter in detail.

As shown in FIG. 6, a resin flow in which at least two molten resins, i.e., at least two layers of fluids are arranged in a lengthwise direction is forced to pass through the manufacturing apparatus according to this exemplary embodiment. In the division mechanism 11, a division operation is performed at a division point A2, in which the laminated flow P1 is divided into two sections in the vertical direction, i.e., divided into upper and lower sections. Further, the upper laminated flow and the lower laminated flow are formed into a first laminated flow P2 and a second laminated flow P3 respectively. The laminated flows P2 and P3 divided by the division mechanism 11 are branched at a branch point B2 in the branch mechanism 12 by guiding the laminated flow P2 to the left direction relative to the flow direction with respect to the line connecting the division point A2 and a middle point C2 in the flow direction, and guiding the laminated flow P3 to the right direction relative to the flow direction. This operation is called "branch operation". Next, the branched laminated flows P2 and P3 are rearranged adjacent to each other in the horizontal direction at the middle point C2 in the rearrangement joining mechanism 13 by guiding the laminated flow P2 to the right direction toward the center of the flow direction and thereby to a junction point D2 and guiding the laminated flow P3 to the left direction toward the center of the flow direction and thereby to the junction point D2. As a result, a laminated flow P4 is formed. In this process, it is preferable that the laminated flows P2 and P3 are guided to the center in both the horizontal direction and the vertical direction. After that, a joining operation is performed for the rearranged and joined laminated flow P4 at the junction point D2 in the stabilization mechanism 14.

The series of theses process 10 (see FIG. 6) is referred to as "left rotation flow path" (hereinafter referred to as "L-flow path"), and by repeatedly performing this L-flow path, it is possible to increase the number of the lamination layers.

Further, as shown in FIG. 7, a resin flow in which at least two molten resins, i.e., at least two layers of fluids are arranged in a lengthwise direction is forced to pass through the manufacturing apparatus according to this exemplary embodiment. In a division mechanism 21, a division operation is performed at a division point E2, in which the laminated flow P4 is divided into two sections in the vertical direction, i.e., divided into upper and lower sections. Further, the upper laminated flow and the lower laminated flow are formed into a first laminated flow P5 and a second laminated flow P6 respectively. The laminated flows P5 and P6 divided by the division mechanism 21 are branched at a branch point F2 in a branch mechanism 22 by guiding the laminated flow P5 to the right direction relative to the flow direction with respect to the line connecting the division point E2 and a middle point G2 in the flow direction, and guiding the laminated flow P6 to the left direction relative to the flow direction. This operation is called "branch operation". Next, the branched laminated flows P5 and P6 are rearranged adjacent to each other in the horizontal direction at the middle point G2 in a rearrangement joining mechanism 23 by guiding the laminated flow P5 to the left direction toward the center of the flow direction and thereby to a junction point H2 and guiding the laminated flow P3 to the right direction toward the center of the flow direction and thereby to the junction point H2. As a result, a laminated flow P7 is formed. In this process, it is preferable that the laminated flows P5 and P6 are guided to the center in both the horizontal direction and the vertical direction. After that, a joining operation is performed for the rearranged and joined laminated flow P7 at the junction point H2 in a stabilization mechanism 14. The series of theses process 20 (see FIG. 7) is referred to as "right rotation flow path" (hereinafter referred to as "R-flow path").

Further, although the flow path from the branch mechanism 12 to the rearrangement joining mechanism 13 or from the branch mechanism 22 to the rearrangement joining mechanism 23 is formed in a bending shape, other shapes such as a curved shape can be also used. That is, the shape of the flow path is not limited to any particular shapes.

By increasing the number of lamination layers through the process in which the L-flow path and the R-flow path are combined, it is possible to reduce the local flow speed variations, which would occur in the conventional flow path shape used to form a multi-laminated body, and thus increasing the resistance to the disruption in the lamination and reducing the thickness variations among the layers. That is, by repeating the division/arrangement operations, it is possible to laminate multiple layers even further.

A manufacturing method of a multi-laminated body according to this exemplary embodiment is formed with an L-flow path shape or an R-flow path shape for which the width W and the thickness H2 of the rectangular cross section of the supplied laminated flow and the position relation between the branch point B2 and the junction point D2 satisfy the following Expression (2).

$$L2/L1 \geq 1.1 \qquad (2)$$

(L1 is the length of the longer one of the width W and the thickness H2 (in the case of shapes other than the rectangle, major axis or longer axis), and L2 is the length from the branch point B2 or F2 to the junction point D2 or H2 in the flow movement direction.)

In this exemplary embodiment, when L1 and L2 satisfy the relation "L2/L1≥1.1", the flow speed distribution difference within the flow path becomes smaller, and thus making it possible to prevent the vertical reduction. When the value L2/L1 is less than 1.1, the flow speed distribution difference within the flow path becomes larger, and thus leading to the disruption in the laminar flow and the disruption in the lamination state. Therefore, it is not preferable. Further, the value L2/L1 is preferably expressed as "1.1≤L2/L1≤5". If not so, the apparatus becomes larger in size and the cost becomes higher. Theoretically, the magnitudes of L1 and L2 should not be restricted at all. However, appropriate magnitudes and/or certain limit values are given to L1 and L2 depending on the specification and the performance of the extrusion machine to be used, the cutting process limit of the flow path shape die to be used, and so on.

Further, the flow path from the branch mechanism 12 to the rearrangement joining mechanism 13 or from the branch mechanism 22 to the rearrangement joining mechanism 23 is formed in a bending shape, and its bending angle R is preferably equal to or smaller than 40 degrees as viewed from above the resin flow direction. Note that when the bending angle is equal to or smaller than 40 degrees, the phenomenon that the maximum flow speed in the flow speed distribution is tilted toward the inner side of the apparatus is alleviated.

Figure 12:
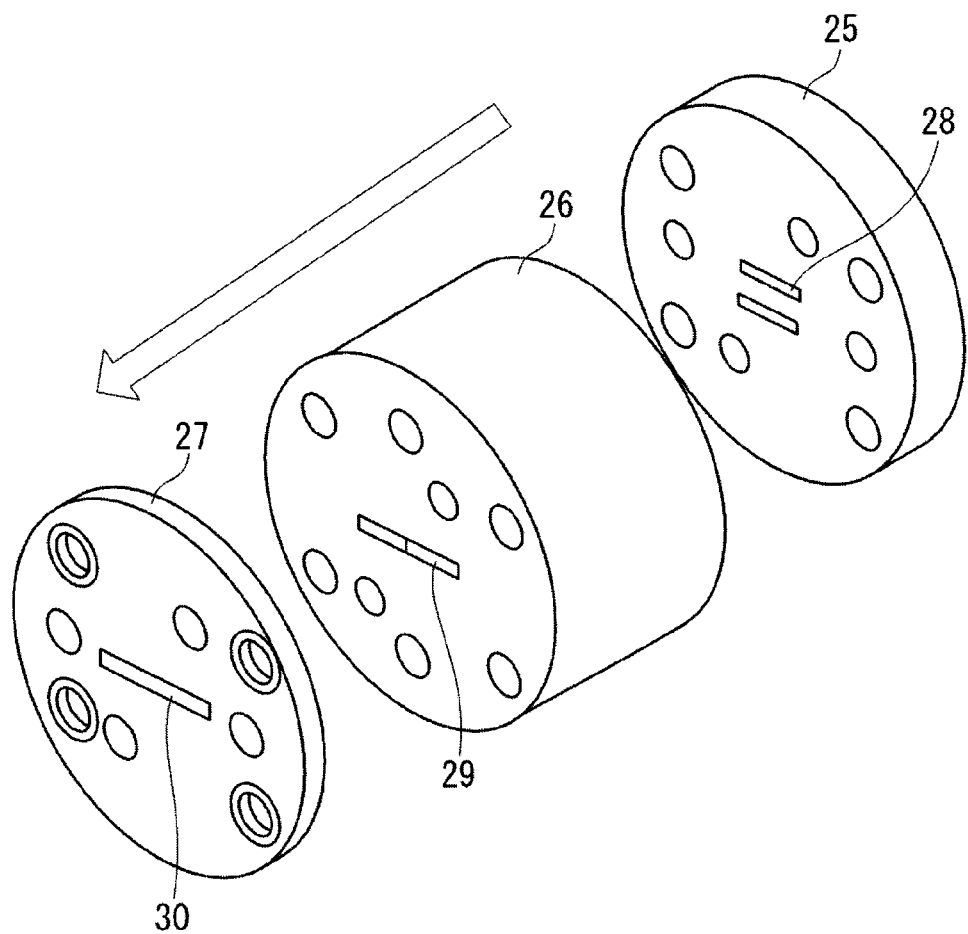
FIG. 12 is a schematic diagram of a set of plates (LME).

Next, a set of plates is explained. FIG. 12 shows a schematic view of a set of plates.

A set of plates means an apparatus including a set of a division plate, an arrangement plate, and a parallel plate (hereinafter referred to as "LME (Layer Multiplying Element)").

A manufacturing apparatus of a multi-laminated body is formed by using a set of plates having an L-flow path or a set of plates having an R-flow path solely, or combining and arranging a set of plates having an L-flow path and a set of plates having an R-flow path.

Firstly, a set of plates having an L-flow path is explained. The division plate divides a laminated flow P1, which is obtained by arranging at least two molten resins adjacent to each other in a lengthwise direction, into two sections in a direction perpendicular to the lengthwise direction, i.e., divided into upper and lower sections. The arrangement plate (L-flow path) includes a flow path that guides the upper laminated flow (first laminated flow: P2) obtained by the division by the above-described division plate to the left direction and a flow path that guides the lower laminated flow (second laminated flow: P3) to the right direction, and subsequently a flow path that guides the first laminated flow P2 to the right direction toward the center and a flow path that guides the second laminated flow P3 to the left direction toward the center. The parallel plate rearranges the laminated flows P2 and P3, which are arranged in the horizontal direction in the above-described arrangement plate, and thereby joins the laminated flows P2 and P3 together as a laminated flow P4.

Next, a set of plates having an R-flow path is explained. The division plate divides a laminated flow P4, which is obtained by arranging at least two molten resins adjacent to each other in a lengthwise direction, into two sections in a direction perpendicular to the lengthwise direction, i.e., divided into upper and lower sections. An arrangement plate (R-flow path) includes a flow path that guides the upper laminated flow (third laminated flow: P5) obtained by the division by the above-described division plate to the right direction and a flow path that guides the lower laminated flow (fourth laminated flow: P6) to the left direction, and subsequently a flow path that guides the third laminated flow P5 to the left direction toward the center and a flow path that guides the fourth laminated flow P6 to the right direction toward the center. A parallel plate rearranges the laminated flows P5 and P6, which are arranged in the horizontal direction in the above-described arrangement plate, and hereby joins the laminated flows P5 and P6 together as a laminated flow P7.

A manufacturing apparatus of a multi-laminated body is formed by solely using the set of plates having an L-flow path or the set of plates having an R-flow path. Further, it is also possible to form a manufacturing apparatus of a multi-laminated body by alternately combining and arranging at least two pairs of the set of plates having an L-flow path and the set of plates having an R-flow path.

Note that the number of apparatuses each including a set of a division plate, an arrangement plate, and a parallel plate, and the number of layers have a relation expressed by the following Expression (3).

$$(\text{Number of arranged layers} = 2^{n+1} + 1) \quad (3)$$

(In the expression, n is the number of LMEs.)

Next, each plate of the LME is explained in a more concrete manner with reference to FIG. 12.

As shown in FIG. 12, a division plate 25 has one opening having a rectangular cross section on the surface of the side from which a laminated flow formed by arranging at least two molten resins adjacent to each other in a lengthwise direction is supplied, and two openings 28, which are arranged in the vertical direction with a predetermined interval therebetween and each of which has a rectangular cross section, on the surface of the opposite side (outflow surface) of the division plate. Further, an arrangement plate 26 has two openings having a shape identical to that of the two openings formed in the outflow surface of the division plate, on the surface of the side abutting on the above-described division plate, and two openings 29, which are arranged in the horizontal direction with a predetermined interval therebetween and each of which has a rectangular cross section, on the surface of the opposite side (outflow surface) to the side abutting on the above-described division plate. Further, a parallel plate 27 has two openings having a shape identical to that of the two openings formed in the outflow surface of the arrangement plate, on the surface of the side abutting on the above-described arrangement plate, and one opening 30 having a rectangular cross section on the surface of the opposite side (outflow surface) to the side abutting on the above-described arrangement plate.

Note that there are no particular restrictions on the shape of these plates, and on the shape and the size of the openings formed in the plates.

Next, a flow speed distribution of a laminated flow within an L-flow path is explained.

Figure 8:
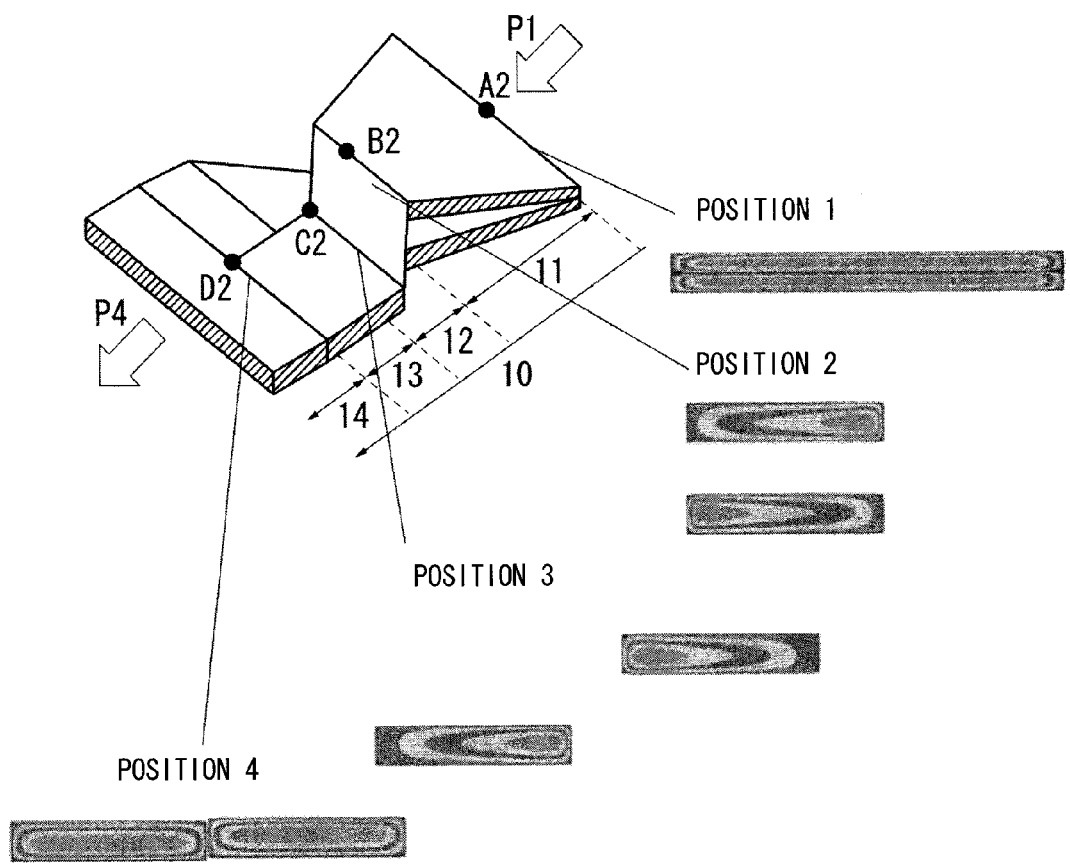
FIG. 8 shows a flow speed distribution of a laminated flow at each position of an L-flow path for which a value L2/L1=0.58, i.e., a value equivalent to that of FIG. 7 of Patent literature 3.

FIG. 8 is an imaginary drawing showing a flow speed distribution of laminated flows P2 and P3 at the inlet of each of the division mechanism 11, the branch mechanism 12, the rearrangement joining mechanism 13, and the stabilization mechanism 14.

The laminated flow P1 is divided into upper and lower sections at the division point A2 of the division mechanism 11, and the laminated flow P2, which is one of the divided laminated flows, flows upward. Therefore, at the position 1 located immediately after the division, a speed difference is generated between the flow above the wall surface of the die (plate) and the flow below the wall surface due to the effect of the viscosity.

Therefore, although the maximum flow speed is located at the center in the flow speed distribution of the laminated flow, the laminated flow P2 has such a shape that it is compressed in the width direction and expanded in the thickness direction while moving upward. Further, the laminated flow P2 is bent to the left direction by the branch mechanism 12. Accordingly, as shown at the position 2, when the laminated flow P2 is supplied into the branch mechanism 12, the flow speed distribution of the laminated flow deviates from the center in the left/right direction and the faster flow speed distribution is tilted toward to the curving side of the flow path.

Further, the laminated flow P2 is guided, by the branch point B2 in the branch mechanism 12, to the left direction relative to the flow direction and bent to the lower right direction toward to the rearrangement joining mechanism 13 with respect to the line connecting the resin division point A2 and the middle point C2 in the flow direction. Therefore, it significantly affects the flow speed distribution within the cross section. As a result, as shown at the position 3, when the laminated flow P2 is supplied into the rearrangement joining mechanism 13, the maximum flow speed in the flow speed distribution of the laminated flow is tilted toward the inner side of the apparatus.

Since the branched laminated flow P2 is guided to the lower tight direction toward the junction point D2 with respect to the line connecting the middle point C2 in the flow direction and the junction point D2 in the rearrangement joining mechanism 13, it significantly affects the flow speed distribution within the cross section. As a result, the laminated flow P2 has the flow speed distribution shown at the position 4 at which the laminated flow P2 is supplied to the joining mechanism.

In this process, when the flow speed distribution at each position has such a distribution that the flow speed significantly varies in the left/right direction in the rectangular cross section shape and thus the flow speed is locally faster, the layer verticality of the formed lengthwise-oriented laminated body significantly deteriorates. For example, in the flow path shape disclosed in Patent literature 3, the relation between L1 and L2 is expressed as "L2/L1=0.58" judging from its drawings. Therefore, this flow path shape suffers from such a phenomenon that the flow speed distribution difference becomes larger and the layer vertically deteriorates.

Figure 9:
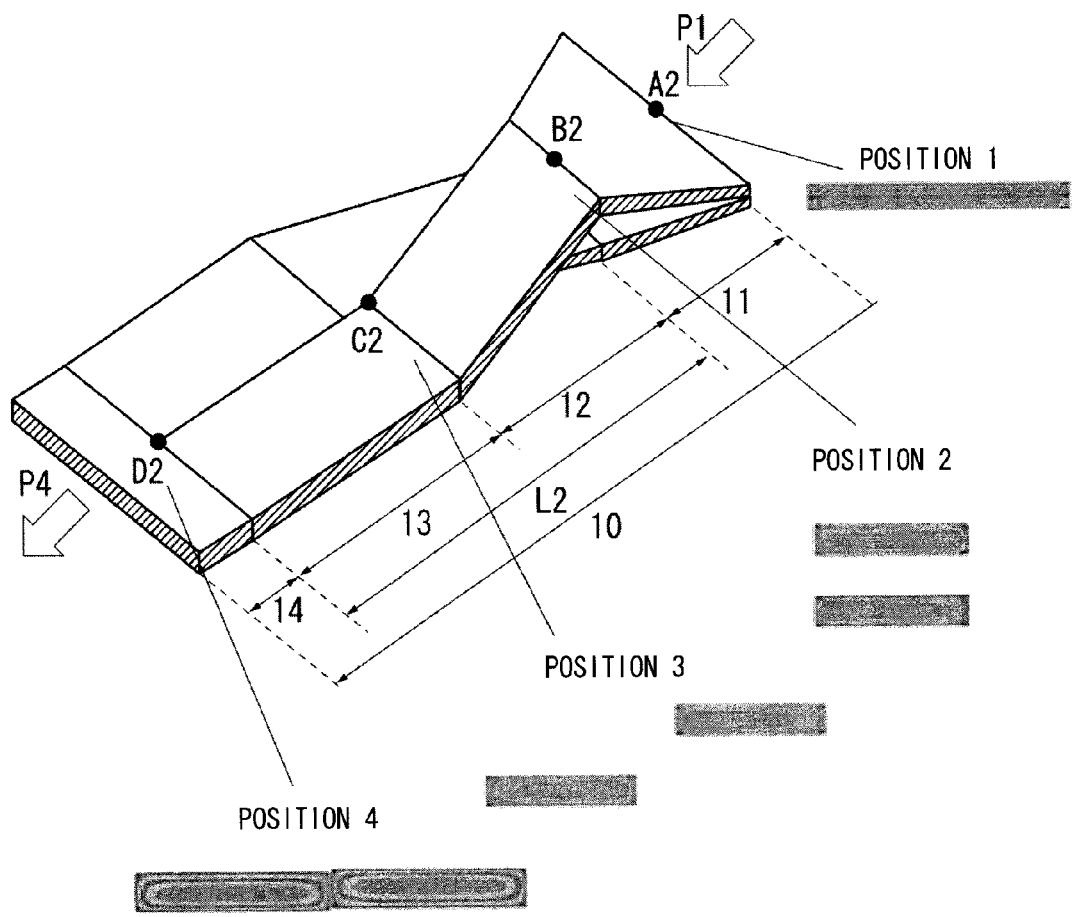
FIG. 9 shows a flow speed distribution of a laminated flow at each position of an L-flow path for which a value L2/L1=2.0.
Figure 10:
FIG. 10 is photographs of cross sections of multi-laminated bodies according to Example 2-1 and Comparative example 2-1.
Figure 10:

However, in this exemplary embodiment, when the relation between L1 and L2 is expressed as "L2/L1=2.0", the flow speed distribution becomes the one shown in FIG. 9. FIG. 9 shows a flow speed distribution of a laminated flow at each position of an L-flow path for which L2/L1=2.0.

In the figure, the scale of the flow speed distribution is based on that of FIG. 8. As obvious from the flow speed distributions at the positions 2 and 3, the flow speed distribution difference within the flow path in FIG. 9 becomes smaller compared to that shown in FIG. 8. Therefore, it is possible to prevent the verticality deterioration. Further, theoretically, the magnitudes of L1 and L2 should not be restricted at all. However, appropriate magnitudes and/or certain limit values are given to L1 and L2 depending on the specification and the performance of the extrusion machine to be used, the cutting process limit of the flow path shape die to be used, and so on. The value L2/L1 preferably satisfies a relation "L2/L1≤5". If not so, an enormous investment is required and the cost becomes higher as the apparatus becomes larger in size.

[Resin]

As the resin used in the present invention, high polymer materials having a melt-fluidity and a hardening ability can be used. However, the materials are not limited to any particular types. Examples of the high polymer material include homopolymers of thermoplastic resins such as e.g., polyolefins such as polyethylene and polypropylenes; poly aromatic vinyls such as polystyrene; acrylic resins such as polymethyl methacrylate; polivinyl alcohols; vinyl chloride resins; polyesters such as polyethylene terephthalate, polyethylene-2,6-naphthalate, and polybutylene terphthalate; polyamides such as nylon 6 and nylon 66; polycarbonates such as poly(bisphenol A carbonate); polyoxymethylene; poly sulfones; cycloolefin resins; fluoroplastics; and silicone resins such as poly(dimethyl siloxane), and copolymers thereof such as e.g., acryl/styrene copolymers and ethylene/vinyl alcohol copolymers as the main ingredient. Further, it may be a mixture of two or more of these materials.

When a polyester copolymer is used, its copolymer component may be a dicarboxylic acid component or a glycol component. Examples of the dicarboxylic acid component include aromatic dicarboxylic acids such as isophthalic acid, phthalic acid, and naphthalene dicarboxylic acid; aliphatic dicarboxylic acids such as adipic acid, azelaic acid, sebacic acid, and decane dicarboxylic acid; and alicyclic dicarboxylic acids such as cyclohexane dicarboxylic acid. Examples of the glycol component include aliphatic diol such as butanediol and hexanediol; alicyclic diol such as cyclohexane dimethanol.

Further, examples of the elastomer include natural rubber, isoprene rubber, and polyamide/olefin/styrene/urethane-based thermoplastic elastomers, and combinations thereof.

Further, examples also include thermosetting resins such as epoxy resins, phenol resins, urethane resins, unsaturated polyester resins, and photocurable resins such as polyfunctional acrylic resins.

Among the above-mentioned resins, preferable resins are those for which the effect due to the melt-viscosity difference between the resins is small.

Further, if necessary, these resins may contain, for example, one of or a combination of two or more of organic or inorganic additives such as a plasticizer, a processing oil, a liquid, a lubricant, an light stabilizer, a fire retardant, an agglutination prevention agent, an UV absorber, an antioxidant, a foaming agent, a light initiator, an anti-fog agent, a pigment, an antistatic agent, and a blocking agent.

[Multi-Laminated Body]

As described above, it is possible to manufacture a multi-laminated body having an excellent verticality of lengthwise-arranged layers by using a manufacturing method/manufacturing apparatus according to the present invention.

EXAMPLES

The present invention is explained in a more concrete manner with examples shown below. However, these examples should not limit the present invention at all.

Various measurement methods according to the present invention are explained hereinafter.

<Number of Layers/Thickness of Lamination>

As for the layer structure of a laminated body, a piece (width direction-thickness direction cross section) was cut out by using a precision low-speed cutting machine (11-1180: Buhler AG) in such a manner that a lamination structure was exposed in the cross section. The surface of the cut-out piece was smoothed by using a microtome (REM-700: Yamato Kohki Industrial Co., Ltd.). Then, optical-microscope observations were carried out for the cut-out sample by using a polarizing microscope (BX50: Olympus Corporation) and a color laser microscope (VK-9500: Keyence Corporation).

<Degree of Layer Thickness Variations>

As for the degree of layer thickness variations, when the discharged amounts of resins A and B extruded from an extrusion machine were equal to each other, the thickness of each layer was measured and the thickness variations in the whole layers were expressed in a percent value(s).

The degree of layer thickness variations was calculated by using the following Expression (4).

$$(\text{Degree of layer thickness variations}) = (\text{Standard deviation of whole layers})/(\text{Mean thickness of layers}) \quad (4)$$

In the above-shown Expression (4), the mean thickness of layers is a mean value of the thickness of each layer composed of the same resin that was obtained by carrying out measurement at at least three points at the center of each layer of a laminated body. Theoretically, the thickness of the layers located at both ends becomes half of that of the layers located in the area other than both ends. Therefore, a value obtained by multiplying the measured thickness by two was used as the thickness of the layers located at both ends.

The mean thickness of layers was calculated by using the following Expression (5).

$$(\text{Mean thickness of layers}) = (d1 \times 2 + d2 + \ldots + d(N-1) + dN)/N \quad (5)$$

(In the expression, N is integer no less than two and dN indicates mean thickness of Nth layer.)

Further, the standard deviation of whole layers is a value of a standard deviation that is obtained by calculating the thicknesses of layers d1 to dN of the lamination structure and the mean thickness of layers as a mean value.

<Layer Verticality>

The layer angle is an angle formed between a line connecting the middle points on the top/bottom surfaces of each layer and a line connecting the middle point on one of the top/bottom surfaces of each layer.

When the layer angle is close to 90 degrees, it means that the verticality of the laminated body is maintained. The effect to the verticality was determined based on a mean value among three layers from the third layer counted from the layer located at the right end of a laminated body with respect to the flow direction, a mean value among three layers located at the center of the laminated body, and three layers from the third layer counted from the layer located at the left end of the laminated body with respect to the flow direction.

Example 1-1

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a die (plate) in which an L-flow path for which L2/L1=0.58 and an R-flow path for which L2/L1=0.58 were alternately arranged, i.e., combined in the order of "L-flow path/R-flow path/L-flow path" while measuring the amounts of the resins A and B by using a gear pump so that the discharge ratio becomes "resin A/resin B=1/1".

In this way, a lamination structure in which the resins A and B were alternately laminated to 17 layers in the width direction within a resin structure having a width of 3 mm and a length of 30 mm was manufactured.

The above-described lamination structure was cut to expose a cross section and the width of each layer was measured. Table 1 shows those measured values.

TABLE 1

| | Combination | Degree of layer variations | Number of layers |
|---|---|---|---|
| Example 1-1 | L/R/L | 7.7% | 17 |
| Comparative example 1-1 | L/L/L | 19.8% | 17 |

Example 1-2

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a die (plate) in which an L-flow path for which L2/L1=0.58 and an R-flow path for which L2/L1=0.58 were alternately arranged, i.e., combined in the order of "L-flow path/R-flow path/L-flow path/R-flow path" while measuring the amounts of the resins A and B by using a gear pump so that the discharge ratio becomes "resin A/resin B=1/1".

In this way, a lamination structure in which the resins A and B were alternately laminated to 33 layers in the width direction within a resin structure having a width of 3 mm and a length of 30 mm was manufactured.

The above-described lamination structure was cut to expose a cross section and the width of each layer was measured. Table 2 shows those measured values.

TABLE 2

| | Combination | Degree of layer variations | Number of layers |
|---|---|---|---|
| Example 1-2 | L/R/L/R | 9.8% | 33 |
| Comparative example 1-2 | L/L/L/L | 36.0% | 33 |
| Comparative example 1-3 | L/R/R/L | 14.2% | 33 |
| Comparative example 1-4 | L/L/R/R | 19.6% | 33 |
| Comparative example 1-5 | L/L/L/R | 22.4% | 33 |

Example 1-3

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80°

C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a plate in which an L-flow path for which L2/L1=0.58 and an R-flow path for which L2/L1=0.58 were alternately arranged, i.e., combined in the order of "L-flow path/R-flow path/L-flow path/R-flow path/L-flow path/R-flow path" while measuring the amounts of the resins A and B by using a gear pump so that the discharge ratio becomes "resin A/resin B=1/1".

In this way, a lamination structure in which the resins A and B were alternately laminated to 129 layers in the width direction within a resin structure having a width of 3 mm and a length of 30 mm was manufactured.

A cross section of the above-described structure was examined. Table 3 shows the measured values.

TABLE 3

| | Combination | Degree of layer variations | Measured number of layers/Theoretical number of molded layers |
|---|---|---|---|
| Example 1-3 | L/R/L/R/L/R | 18.0% | 129 layers/129 layers |
| Comparative example 1-6 | L/L/L/L/L | 34.2% | 125 layers/129 layers |

Comparative Example 1-1

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a die (plate) in which an only the L-flow path for which L2/L1=0.58 was alternately arranged, i.e., combined in the order of "L-flow path/L-flow path/L-flow path" while measuring the amounts of the resins A and B by using a gear pump so that the discharge ratio becomes "resin A/resin B=1/1".

In this way, a lamination structure in which the resins A and B were alternately laminated to 17 layers in the width direction within a resin structure having a width of 3 mm and a length of 30 mm was manufactured.

The above-described lamination structure was cut to expose a cross section and the width of each layer was measured. Table 1 shows those measured values.

Comparative Example 1-2

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a plate in which only the L-flow path for which L2/L1=0.58 was arranged, i.e., combined in the order of "L-flow path/L-flow path/L-flow path/L-flow path" while measuring the amounts of the resins A and B by using a gear pump so that the discharge ratio becomes "resin A/resin B=1/1".

In this way, a structure in which the resins A and B were alternately laminated to 33 layers in the width direction within a resin structure having a width of 3 mm and a length of 30 mm was manufactured.

The above-described lamination structure was cut to expose a cross section and the width of each layer was measured. Table 2 shows measured values obtained in this measurement.

This comparative example corresponds to a combination according to the conventional same-direction arrangement scheme.

Comparative Example 1-3

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a plate in which an L-flow path for which L2/L1=0.58 and an R-flow path for which L2/L1=0.58 were combined in the order of "L-flow path/R-flow path/R-flow path/L-flow path" while measuring the amounts of the resins A and B by using a gear pump so that the discharge ratio becomes "resin A/resin B=1/1".

In this way, a structure in which the resins A and B were alternately laminated to 33 layers in the width direction within a resin structure having a width of 3 mm and a length of 30 mm was manufactured.

The above-described lamination structure was cut to expose a cross section and the width of each layer was measured. Table 2 shows those measured values.

Comparative Example 1-4

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a plate in which an L-flow path for which L2/L1=0.58 and an R-flow path for which L2/L1=0.58 were combined in the order of "L-flow path/L-flow path/R-flow path/R-flow path" while measuring the amounts of the resins A and B by using a gear pump so that the discharge ratio becomes "resin A/resin B=1/1".

In this way, a structure in which the resins A and B were alternately laminated to 33 layers in the width direction within a resin structure having a width of 3 mm and a length of 30 mm was manufactured.

The above-described lamination structure was cut to expose a cross section and the width of each layer was measured. Table 2 shows those measured values.

Comparative Example 1-5

As the material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a die (plate) in which an L-flow path for which $L2/L1=0.58$ and an R-flow path for which $L2/L1=0.58$ were combined in the order of "L-flow path/L-flow path/L-flow path/R-flow path" while measuring the amounts of the resins A and B by using a gear pump so that the discharge ratio becomes "resin A/resin B=1/1".

In this way, a structure in which the resins A and B were alternately laminated to 33 layers in the width direction within a resin structure having a width of 3 mm and a length of 30 mm was manufactured.

The above-described lamination structure was cut to expose a cross section and the width of each layer was measured. Table 2 shows those measured values.

Comparative Example 1-6

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a die (plate) in which only the L-flow path for which $L2/L1=0.58$ was arranged, i.e., combined in the order of "L-flow path/L-flow path/L-flow path/L-flow path/L-flow path/L-flow path" while measuring the amounts of the resins A and B by using a gear pump so that the discharge ratio becomes "resin A/resin B=1/1".

In this way, a structure in which the resins A and B were alternately laminated to 125 layers in the width direction within a resin structure having a width of 3 mm and a length of 30 mm was manufactured.

A cross section of the above-described structure was examined. Table 3 shows the number of layers obtained as a result of this examination.

Based on the above-shown results, the lamination structures in which 17 layers were laminated by combining LMEs are examined hereinafter. In particular, Example 1-1 in which LMEs were alternately combined in the order of "L-flow path/R-flow path/L-flow path" and the comparative example in which only the L-flow path was combined in the order of "L-flow path/L-flow path/L-flow path" are examined. As shown in Table 1, the degree of the layer variations is very low in Example 1-1.

Next, the lamination structures in which 33 layers were laminated by the different LME combination methods are examined. In particular, Example 1-2 and Comparative examples 1-2 to 1-5 are examined.

Figure 4:
FIG. 4 is photographs of multi-laminated bodies according to Example 1-2 and Comparative examples 1-2 to 1-5.
Figure 4:
Figure 4:
Figure 4:
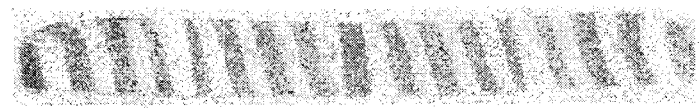
Figure 4:
Figure 5:
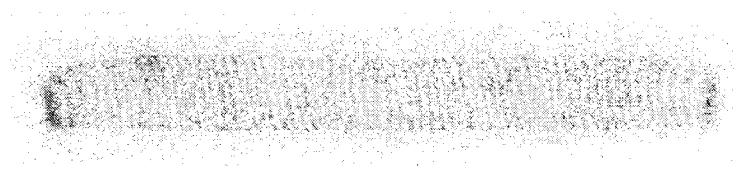
FIG. 5 is photographs of multi-laminated bodies according to Example 1-3 and Comparative example 1-6.
Figure 5:
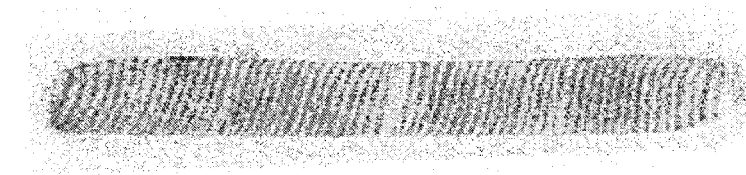

FIG. 4 is photographs of multi-laminated bodies according to Example 1-2 and Comparative examples 1-2 to 1-5 in which different LME combination methods were used.

When Comparative example 1-2, which used the conventional same-direction arrangement scheme, is compared with Example 1-2 and Comparative examples 1-3 to 1-5, in each of which the L-flow path and the R-flow path were combined, it is obvious that the outermost layers are clearly present in any of the latter examples.

Further, by comparing Example 1-2 with Comparative examples 1-3 to 1-5, we have confirmed that layers are narrower in some places in Comparative examples 1-4 and 1-5 as shown in FIG. 4. It is believed that the central part of Comparative example 1-5 in which the layer is very narrow as shown in FIG. 4 was caused because the disruption in the layer arrangement that was formed when the laminated flow passed through the third set of the LMEs (disappearance phenomenon of outermost layer) was incorporated into the inside of the arranged article in the division/arrangement process performed in the fourth set of the LMEs.

Further, in Comparative examples 1-4, the 9th and 24th layers counted from the left side were narrower. Therefore, it is believed that the disruption in the layers that was formed when the laminated flow passed through the second set of the LMEs was incorporated into the inside of the arranged article when it passed through the third and fourth set of the LMEs. By comparing and examining the places where the layers were supposed to be disrupted and the combination order, it is shown that the disruptions occurred in the places where the laminated flow flowed in the order of "L-flow path/L-flow path/L-flow path/R-flow path in Comparative example 1-5 and where the laminated flow had flowed in the order of "L-flow path/L-flow path/R-flow path/R-flow path in Comparative example 1-3.

These disruptions occurred when the laminar flow that has been successively arranged in the same direction subsequently flows through the place where the flow path was alternately combined and the arrangement direction was thereby reversed. By examining this phenomenon by using Comparative examples 1-2 and 1-5, it can be presumed as follows. That is, every time a resin flows in the same direction, a disappeared part in the resin becomes larger. Therefore, it is shown that once the structure in which the top/bottom surface layer widths of the end layers are unbalanced is formed, the following phenomenon occurs when the division/arrangement process is further repeated. That is, it is believed that in Comparative example 1-2, the layer disappearance at both ends increased. Meanwhile, in Comparative example 1-5, the narrow layer was formed at the center and therefore the disruption in the arrangement state occurred.

Further, as shown in FIG. 4, in Comparative example 1-3, there are a place where the lower part of the layer was narrow in the 13th layer and a place where the upper part of the layer was narrow in the 21th layer. By examining the parts where the layer became narrower as shown in Comparative example 1-3 by counting back the set number, it is shown that these parts were caused when the laminated flow passed through the first set. These parts correspond to a place where the widths of the top/bottom layers located at the end are different, which is caused when the laminar flow leans to the right after it passes through the first set of the LMEs. Therefore, the parts where the width is narrow become the parts where the layer is narrow in their fourth set. Further, it is shown that due to the effect of the arrangement state in the first set, a few narrow layers are present in the fourth set.

Based on these results, it is believed that the combination of Example 1-2 is the one that achieves the best advantageous effect of reducing the layer disappearance at both ends.

Next, by examining the alternate arrangements in Examples 1-2 and 1-3, it can be presumed that by alternately combining the L-flow path and the R-flow path, the unbalance of the top/bottom layer widths at the end layers are averaged after the division/arrangement process, and thus providing the advantageous effect of reducing the layer disappearance at both ends.

Consequently, in order to prevent the layer disappearance at both ends and maintain the uniformity of the layer widths, it is important to alleviate the inclination of the laminar flow within the LMEs. Therefore, LMEs are preferably configured so that the L-flow path and the R-flow path are alternately combined as in the case of Examples 1-2 and 1-3.

Based on the above-shown results, in the manufacturing method using the arrangement scheme like the ones shown in Comparative examples 1-2 to 1-6, the layers at both ends decrease. As a result, as the number of LMEs increases, the layers at both ends and at the center disappear. Further, in Comparative example 1-6, only 125 layers could be observed among 129 layers, which is the theoretical number of layers to be formed.

In contrast to this, in the manufacturing method using the alternate arrangement scheme like the ones shown in Examples 1-2 and 1-3 in which the L-flow path and the R-flow path are alternately arranged, the layers at the outermost layers could be clearly observed even when the number of LME sets was increased. Further, no layer disappearance at the ends and at the center was observed.

Based on the above-shown results, it can be presumed that in the manufacturing method using the arrangement scheme of Comparative examples 1-2 to 1-6, the difference between layer widths in the top/bottom surface layers at both ends, which is caused by the inclination of the laminar flow, causes the layer disappearance at the ends and at the center. In contrast to this, in the manufacturing method using the alternate arrangement scheme of Examples 1-2 and 1-3, it is believed that the difference between layer widths in the top/bottom surface layers at both ends, which is caused by the inclination of the laminar flow, is alleviated. Therefore, the situation in which the layers at the ends are extremely reduced is prevented and the layer widths are averaged. As a result, the layer disappearance at the ends hardly occurs even when the division/arrangement process is repeated.

As explained above, in the manufacturing method and the manufacturing apparatus of a multi-laminated body of Examples 1-1 to 1-3, it is possible to reduce the local flow speed variations occurring within the flow path shape, increase the resistance to the disruption in the lamination, and reduce the thickness variations among the layers. Further, since the defective parts due to the thickness variations are reduced, the layer disappearance, which would occur every time the division, the branching, and the rearrangement joining are repeated, is reduced. Therefore, it is possible to increase the number of alternately-laminated excellent layers to a number two times or four times as large as that of the conventional technique.

Example 2-1

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a die (plate) in which L-flow paths for each of which $L2/L1=2.0$ were combined in the order of "L-flow path/L-flow path/L-flow path" while measuring the amounts of the resins A and B by using a gear pump so that the discharge ratio becomes "resin A/resin B=1/1".

In this way, a multi-laminated body in which the resins A and B were alternately laminated to 17 layers in the width direction within an extrusion-molded body having a thickness of 3 mm and a width of 30 mm was manufactured.

The above-described multi-laminated body was cut to expose a cross section and the width of each layer was measured. Table 4 shows those measured values.

TABLE 4

| | L-flow path device (sets) | L2/L1 | Position (Verticality) | | | Number of layers |
| --- | --- | --- | --- | --- | --- | --- |
| | | | Right side | Center | Left side | |
| Example 2-1 | 3 | 2.0 | 87.8 | 87.2 | 87.6 | 17 |
| Comparative example 2-1 | 3 | 0.58 | 72.2 | 72.1 | 73.2 | 17 |

Example 2-2

As the resin material used for a multi-laminated body, polymethyl methacrylate (PMMA, Parapet GF: Kuraray Co., Ltd.) having a shear-rate-dependent viscosity was used for both a resin A and a resin B.

A fluidity analysis was carried out by performing a simulation (fluidity analysis software "POLYFLOW" (ANSYS Japan K.K.)) under the conditions that: each of the resins A and B was brought into a molten state at 235° C.; the discharge ratio was "resin A/resin B=1/1"; and an L-flow path for which $L2/L1=2.0$ was used from the laminated flow inlet.

Based on the results obtained by the above-described simulation, the verticality of each layer was measured by the above-described method. Because of the symmetry of the flow path, the vertically was measured only on one side in the simulation. The obtained measurement values were good agreement with those of Example 2-1 carried out in the same conditions. Table 5 shows the results.

Example 2-3

As the resin material used for a multi-laminated body, polymethyl methacrylate (PMMA, Parapet GF: Kuraray Co., Ltd.) having a shear-rate-dependent viscosity was used for both a resin A and a resin B.

A fluidity analysis was carried out by performing a simulation under the condition that: each of the resins A and B was brought into a molten state at 235° C.; the discharge ratio was "resin A/resin B=1/1"; and an L-flow path for which L2/L1=1.32 was used from the laminated flow inlet.

Based on the results obtained by the above-described simulation, the verticality of each layer was measured by the above-described method. Because of the symmetry of the flow path, the vertically was measured only on one side in the simulation. Table 5 shows the obtained measurement values.

TABLE 5

|  | L2/L1 | Position (Verticality) | |
|---|---|---|---|
|  |  | Right side | Center |
| Example 2-2 | 2.0 | 88.2 | 87.0 |
| Example 2-3 | 1.32 | 86.8 | 86.1 |
| Comparative example 2-2 | 0.98 | 84.2 | 83.6 |
| Comparative example 2-3 | 0.49 | 74.2 | 71.5 |

Example 2-4

As the material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, the resins A and B were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a die (plate) in which an L-flow path for which L2/L1=2.0 and an R-flowpath were alternatively arranged, i.e., combined in the order of "L-flow path/R-flow path/L-flow path/R-flow path/L-flow path/R-flow path" while measuring the amounts of the resins A and B by using a gear pump so that the discharge ratio becomes "resin A/resin B=1/1".

In this way, a multi-laminated body in which the resins A and B were alternately laminated to 129 layers in the width direction within an extrusion-molded body having a thickness of 3 mm and a width of 30 mm was manufactured.

Figure 11:
FIG. 11 is photographs of cross sections of multi-laminated bodies according to Example 2-4 and Comparative example 2-4.
Figure 11:

FIG. 11 shows a cross section obtained by cutting the above-described multi-laminated body.

Comparative Example 2-1

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, they were supplied to an extrusion machine (PSV-type 22 mm: PULAENG Company Ltd.).

Each of the resins A and B was brought into a molten state at 235° C. in the extrusion machine and was supplied through a laminated flow inlet into a multi-lamination extrusion molding machine using a die (plate) in which L-flow paths for each of which L2/L1=0.58 were combined in the order of "L-flow path/L-flow path/L-flow path" while measuring the amounts of the resins A and B by using a gear pump so that the discharge ratio becomes "resin A/resin B=1/1". In this way, a multi-laminated body in which the resins A and B were alternately laminated to 17 layers in the width direction within an extrusion-molded body having a thickness of 3 mm and a width of 30 mm was manufactured.

The above-described multi-laminated body was cut to expose a cross section and the verticality of each layer was measured. Table 4 shows the measured values.

Comparative Example 2-2

As the resin material used for a multi-laminated body, polymethyl methacrylate (PMMA, Parapet GF: Kuraray Co., Ltd.) having a shear-rate-dependent viscosity was used for both a resin A and a resin B.

A fluidity analysis was carried out by performing a simulation under the conditions that: each of the resins A and B was brought into a molten state at 235° C.; the discharge ratio was "resin A/resin B=1/1"; and an L-flow path for which L2/L1=0.98 was used from the laminated flow inlet.

Based on the results obtained by the above-described simulation, the verticality of each layer was measured by the above-described method. Because of the symmetry of the flow path, the vertically was measured only on one side in the simulation. Table 5 shows the obtained measurement values.

Comparative Example 2-3

As the resin material used for a multi-laminated body, polymethyl methacrylate (PMMA, Parapet GF: Kuraray Co., Ltd.) having a shear-rate-dependent viscosity was used for both a resin A and a resin B.

A fluidity analysis was carried out by performing a simulation under the condition that: each of the resins A and B was brought into a molten state at 235° C.; the discharge ratio was "resin A/resin B=1/1"; and an L-flow path for which L2/L1=0.49 was used from the laminated flow inlet.

Based on the results obtained by the above-described simulation, the verticality of each layer was measured by the above-described method. Because of the symmetry of the flow path, the vertically was measured only on one side in the simulation. Table 5 shows the obtained measurement values.

Comparative Example 2-4

As the resin material used for a multi-laminated body, polymethyl methacrylate (PMMA, Parapet GF: Kuraray Co., Ltd.) and ultramarine polymethyl methacrylate (PMMA, Parapet GF: Kuraray Co., Ltd.) were used as a resin A and a resin B respectively. After the resins A and B were dried at 80° C. for a whole day and night, the resins A and B were supplied to an extrusion machine (PSV-type 22 mm: PULAENG Company Ltd.).

Each of the resins A and B was brought into a molten state at 235° C. in the extrusion machine (PSV-type 22 mm: PULAENG Company Ltd.) and was supplied through a laminated flow inlet into a multi-lamination extrusion molding machine using a die (plate) in which L-flow paths for each of which L2/L1=0.58 were combined in the order of "L-flow path/L-flow path/L-flow path/L-flow path/L-flow path/L-flow path" while measuring the amounts of the resins A and B by using a gear pump so that the discharge ratio becomes "resin A/resin B=1/1".

In this way, a multi-laminated body in which the resins A and B were alternately laminated in the width direction within an extrusion-molded body having a thickness of 3 mm and a width of 30 mm was manufactured.

FIG. 11 shows a cross section obtained by cutting the above-described multi-laminated body.

Based on the above-shown results, when the flow path shown in FIG. 8 is compared with the long flow path shown in FIG. 9, it is shown that the resin, which is divided into the upper and lower sections, flows in a state where the layers in the lengthwise arrangement is substantially maintained until the curved section of the arrangement plate (point B2 in FIG. 6, point E2 in FIG. 7).

At and after the curved section of the arrangement plate (point B2 in FIG. 6, point E2 in FIG. 7), the flow changes in such a manner that the layers in the lengthwise arrangement is inclined in the flow path shown in FIG. 8. In contrast to this, there is no substantial change in the inclination of the layers in the lengthwise arrangement in the flow path shown in FIG. 9.

Further, it is shown that, though the flow speed tends to increase at the arrangement plate section in both the flow paths in FIGS. 8 and 9, the flow speed abruptly increases in the flow path in FIG. 8.

Based on the above-shown results, it is believed that by increasing the flow path length of the arrangement plate, the change of the flow speed can be made gentler and the unbalanced flow speeds can be thereby prevented.

In the plate in which sets of plates (LME) shown in FIG. 12 are combined, when the arrangement states shown in FIGS. 8 and 9 are compared, the verticality of the arrangement is improved in the long flow path arrangement scheme shown in FIG. 9 than that in the arrangement scheme shown in FIG. 8. Further, as for the layers located at both ends, there is substantially no difference between the flow paths in FIGS. 8 and 9. That is, the layers at both ends tend to disappear in both flow paths in FIGS. 8 and 9.

Based on these results, it can be presumed that the phenomenon that each layer is inclined is affected by the shape of the arrangement plate section. Therefore, it becomes obvious that in order to maintain the layer verticality, it is important to design the flow path so that the laminar flow does not change abruptly.

Based on the photographs of the cross sections of Example 2-4 and Comparative example 2-4, it is obvious that the verticality is improved and the arrangement is formed in a substantially orderly fashion in the alternate long flow path arrangement scheme in Example 2-4. That is, it is possible to achieve an advantageous effect of preventing the layer disappearance at both ends while maintaining the layer verticality.

As described so far, in comparison with the flow path shown in FIG. 8, it is possible to reduce the abrupt flow speed change in the arrangement plate section, prevent the inclination of layers, and improve the verticality of the lengthwise arrangement by increasing the flow path length as shown in FIGS. 6 and 7.

Further, it is possible to obtain a multi-laminated body capable of reducing the local flow speed variations occurring within the flow path shape that is used to form a multi-laminated body, reducing the pressure distribution, increasing the resistance to the disruption in the lamination, reducing the inclination of each layer, and maintaining the verticality of the layers oriented in the lengthwise direction.

Further, since the defective parts due to the vertical reduction of the layers are reduced, the layer disappearance, which would start to occur every time the division, the branching rearrangement, and the joining are repeated, is reduced. Therefore, it is possible to increase the number of alternately-laminated excellent layers to a number two times or four times as large as that of the conventional technique while maintaining the verticality.

This application is based upon and claims the benefit of priorities from Japanese patent application No. 2010-119395 filed on May 25, 2010 and Japanese patent application No. 2010-127789 filed on Jun. 3, 2010, and the disclosures of which are incorporated herein in their entirety by reference.

INDUSTRIAL APPLICABILITY

A manufacturing method and a manufacturing apparatus of a multi-laminated body according to the present invention can be preferably applied to the manufacture of high-functionality films and the like, such as an optical film using optical control such as a polarizing-plate protection film of a liquid crystal display device and an optical compensation film.

REFERENCE SIGNS LIST

1 WHOLE PROCESSES OF L-FLOW PATH
11 DIVISION MECHANISM OF L-FLOW PATH
12 BRANCH MECHANISM OF L-FLOW PATH
13 REARRANGEMENT JOINING MECHANISM OF L-FLOW PATH
14 STABILIZATION MECHANISM OF L-FLOW PATH
A1 DIVISION POINT OF DIVISION MECHANISM OF L-FLOW PATH
B1 MIDDLE POINT IN FLOW DIRECTION OF L-FLOW PATH
C1 JUNCTION POINT OF REARRANGEMENT JOINING MECHANISM OF L-FLOW PATH
A2 DIVISION POINT OF DIVISION MECHANISM OF L-FLOW PATH
B2 BRANCH POINT IN FLOW DIRECTION OF L-FLOW PATH
C2 MIDDLE POINT IN FLOW DIRECTION OF L-FLOW PATH
D2 JUNCTION POINT OF REARRANGEMENT JOINING MECHANISM OF L-FLOW PATH
P1 LAMINATED FLOW
P2 LAMINATED FLOW DIVIDED UPWARD BY DIVISION MECHANISM OF L-FLOW PATH
P3 LAMINATED FLOW DIVIDED DOWNWARD BY DIVISION MECHANISM OF L-FLOW PATH
P4 LAMINATED FLOW COMBINED BY REARRANGEMENT JOINING MECHANISM OF L-FLOW PATH
2 WHOLE PROCESSES OF R-FLOW PATH
21 DIVISION MECHANISM OF R-FLOW PATH
22 BRANCH MECHANISM OF R-FLOW PATH
23 REARRANGEMENT JOINING MECHANISM OF R-FLOW PATH
24 STABILIZATION MECHANISM OF R-FLOW PATH
25 DIVISION PLATE
26 ARRANGEMENT PLATE
27 PARALLEL PLATE
28 OPENING
29 OPENING
30 OPENING
D1 DIVISION POINT OF DIVISION MECHANISM OF R-FLOW PATH
E1 MIDDLE POINT IN FLOW DIRECTION OF R-FLOW PATH
F1 JUNCTION POINT OF REARRANGEMENT JOINING MECHANISM OF R-FLOW PATH
D2 DIVISION POINT OF DIVISION MECHANISM OF R-FLOW PATH
E2 BRANCH POINT IN FLOW DIRECTION OF R-FLOW PATH
F2 MIDDLE POINT IN FLOW DIRECTION OF R-FLOW PATH
G2 JUNCTION POINT OF REARRANGEMENT JOINING MECHANISM OF R-FLOW PATH

P5 LAMINATED FLOW DIVIDED UPWARD BY DIVISION MECHANISM OF R-FLOW PATH
P6 LAMINATED FLOW DIVIDED DOWNWARD BY DIVISION MECHANISM OF R-FLOW PATH
P7 LAMINATED FLOW COMBINED BY REARRANGEMENT JOINING MECHANISM OF R-FLOW PATH

The invention claimed is:

1. A method of manufacturing a multi-laminated body, the method comprising:
arranging at least two molten resins adjacent to each other in a lengthwise direction and forming a laminated flow having a predetermined width and thickness;
vertically dividing, at a division point, the laminated flow into two sections, and forming an upper laminated flow and a lower laminated flow obtained by the division into a first laminated flow and a second laminated flow, respectively;
guiding, at a branch point, the first laminated flow to a first direction, the first direction being one of a left direction and a right direction relative to a flow direction and guiding the second laminated flow to a second direction, the second direction being another one of the left direction and the right direction relative to the flow direction;
guiding, at a middle point, the first laminated flow to the second direction and a downward direction toward a center of the flow direction, guiding the second laminated flow to the first direction and an upward direction toward the center of the flow direction; and
rearranging, at a junction point, the first and second laminated flows adjacent to each other in a horizontal direction and thereby joining the first and second laminated flows together,
wherein:
a relation expressed by a following expression (X) is satisfied:

$$L2/L1 \geq 1.1 \qquad (X);$$

L1 is the width of the laminated flow; and
L2 is a length from the branch point to the junction point in a flow movement direction.

2. The method according to claim 1, comprising:
a method (1) comprising:
arranging at least two molten resins adjacent to each other in a lengthwise direction and forming a laminated flow having a predetermined width and thickness;
vertically dividing, at a division point A2, the laminated flow into two sections, and forming an upper laminated flow and a lower laminated flow obtained by the division into a first laminated flow and a second laminated flow respectively;
guiding, at a branch point B2, the first laminated flow to a first direction, the first direction being one of a left direction and a right direction relative to a flow direction and guiding the second laminated flow to a second direction, the second direction being another one of the left direction and the right direction relative to the flow direction;
guiding, at a middle point C2, the first laminated flow to the second direction and a downward direction toward a center of the flow direction, guiding the second laminated flow to the first direction and an upward direction toward the center of the flow direction; and
rearranging, at a junction point D2, the first and second laminated flows adjacent to each other in a horizontal direction and thereby joining the first and second laminated flows together; and
a method (2) comprising:
vertically dividing, at a division point E2, the rearranged and joined laminated flow into two sections, and forming an upper laminated flow and a lower laminated flow obtained by the division into a third laminated flow and a fourth laminated flow respectively;
guiding, at a branch point F2, the third laminated flow to the second direction relative to a flow direction and guiding the fourth laminated flow to the first direction relative to the flow direction;
guiding, at a middle point G2, the third laminated flow to the first direction and a downward direction toward a center of the flow direction, guiding the fourth laminated flow to the second direction and an upward direction toward the center of the flow direction; and
rearranging, at a junction point H2, the third and fourth laminated flows adjacent to each other in a horizontal direction and thereby joining the third and fourth laminated flows together,
wherein at least one of the method (1) and the method (2) satisfies the relation expressed by the expression (X).

3. The method according to claim 2, wherein the method (1) and the method (2) are alternately repeated.

4. The method according to claim 1, wherein L2/L1 satisfies an expression: $1.1 \leq L2/L1 \leq 5$.